(12) United States Patent
Fong et al.

(10) Patent No.: US 12,353,653 B2
(45) Date of Patent: *Jul. 8, 2025

(54) CAPACITIVE KNOB SENSING SYSTEM AND METHOD TO DETECT INITIAL STATES

(71) Applicant: Synaptics Incorporated, San Jose, CA (US)

(72) Inventors: Kelvin Fong, Milpitas, CA (US); Tomohiro Hirakawa, Chiba (JP); Yan-Ju Du, Xiamen (CN)

(73) Assignee: Synaptics Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/432,565

(22) Filed: Feb. 5, 2024

(65) Prior Publication Data

US 2024/0176435 A1   May 30, 2024

Related U.S. Application Data

(63) Continuation of application No. 17/821,866, filed on Aug. 24, 2022, now Pat. No. 11,928,271.

(51) Int. Cl.
  *G06F 3/0362*  (2013.01)
  *B60K 35/10*  (2024.01)
  *G06F 3/044*  (2006.01)

(52) U.S. Cl.
  CPC ............ *G06F 3/0362* (2013.01); *B60K 35/10* (2024.01); *G06F 3/0446* (2019.05); *B60K 2360/126* (2024.01)

(58) Field of Classification Search
  CPC ...... G06F 3/0362; G06F 3/0446; G06F 3/044; G06F 3/0416; B60K 35/10; B60K 2360/126
  See application file for complete search history.

(56) References Cited

U.S. PATENT DOCUMENTS

| | | | |
|---|---|---|---|
| 9,831,872 B1 * | 11/2017 | Salter | B60K 35/10 |
| 10,288,658 B2 * | 5/2019 | Spevak | G06F 3/0383 |
| 10,574,232 B2 * | 2/2020 | Kwon | H03K 17/975 |
| 10,921,913 B1 * | 2/2021 | Fong | G06F 3/04162 |

(Continued)

OTHER PUBLICATIONS

U.S. Appl. No. 17/821,866, filed Aug. 24, 2022.

*Primary Examiner* — Ibrahim A Khan
(74) *Attorney, Agent, or Firm* — Leydig Voit & Mayer, Ltd.

(57) ABSTRACT

A method is provided. The method comprises: obtaining, by a processing system and using a set of rotation electrodes that interact with the knob interface, first resulting signals and second resulting signals; determining, by the processing system, an initial state of the knob interface using the first resulting signals and the second resulting signals; obtaining, by the processing system and using the set of rotation electrodes, third resulting signals indicating a first rotational state of the knob interface, based at least in part on the knob interface being rotated from the initial state to the first rotational state; determining, by the processing system, the rotational direction of the knob interface using the first resulting signals, the second resulting signals, and the third resulting signals; and adjusting, by the processing system, a setting using the determined rotational direction.

19 Claims, 16 Drawing Sheets

(56) References Cited

U.S. PATENT DOCUMENTS

| | | |
|---|---|---|
| 11,256,376 B2 | 2/2022 | Fong et al. |
| 2009/0009491 A1* | 1/2009 | Grivna ............... H03K 17/9622 345/184 |
| 2011/0242064 A1* | 10/2011 | Ono ..................... G01C 21/265 345/184 |
| 2016/0079014 A1* | 3/2016 | Takano ............. H01H 19/6355 200/11 A |
| 2016/0294387 A1* | 10/2016 | Maigler ................. H03K 17/98 |
| 2017/0255266 A1* | 9/2017 | Holenarsipur .......... G06F 3/016 |
| 2017/0370747 A1* | 12/2017 | Uchida .................... G01D 5/16 |
| 2021/0232260 A1* | 7/2021 | Fong .................... G06F 3/0446 |
| 2022/0091683 A1* | 3/2022 | Beyhs .................. G06F 3/0362 |
| 2022/0214764 A1 | 7/2022 | Fong |
| 2022/0244810 A1 | 8/2022 | Fong |
| 2023/0004225 A1* | 1/2023 | Orita ..................... G06F 3/0488 |
| 2023/0135972 A1* | 5/2023 | Szczerba ............... B60K 35/00 701/36 |
| 2024/0069655 A1* | 2/2024 | Fong .................... G06F 3/0362 |

* cited by examiner

CAPACITIVE KNOB SENSING SYSTEM AND METHOD TO DETECT INITIAL STATES

CROSS-REFERENCE TO RELATED APPLICATIONS

This patent application is a continuation of U.S. patent application Ser. No. 17/821,866, filed Aug. 24, 2022, which is incorporated by reference herein in its entirety.

TECHNICAL FIELD

This disclosure relates generally to a rotatable knob interface.

BACKGROUND

Input devices including proximity sensor devices may be used in a variety of electronic systems. A proximity sensor device may include a sensing region, demarked by a surface, in which the proximity sensor device determines the presence, location, force and/or motion of one or more input objects. Proximity sensor devices may be used to provide interfaces for the electronic system. For example, proximity sensor devices may be used as input devices for larger computing systems, such as touchpads integrated in, or peripheral to, notebook or desktop computers. Proximity sensor devices may also often be used in smaller computing systems, such as touch screens integrated in cellular phones. Additionally, proximity sensor devices may be implemented as part of a multi-media entertainment system of an automobile. In such cases, it is useful to interface a knob to a proximity sensor device.

Traditionally, the knob interface may include a quadrature encoder rotary system that requires the rotary system to rotate by two states (e.g., two detents or resolutions) before the direction (e.g., whether the knob is being rotated clockwise or counterclockwise) is determined. However, a user may seek to adjust a setting (e.g., fan, temperature, and/or volume) by a single state. If the user rotates the knob by a single state, the system might not be capable of adjusting the setting as the direction (e.g., clockwise or counterclockwise) is unknown.

SUMMARY

This summary is provided to introduce a selection of concepts in a simplified form that are further described below. This summary is not intended to necessarily identify key features or essential features of the present disclosure. The present disclosure may include the following various aspects and embodiments.

In an exemplary embodiment, the present disclosure provides a method. The method comprises: obtaining, by a processing system and using a set of rotation electrodes that interact with the knob interface, first resulting signals and second resulting signals; determining, by the processing system, an initial state of the knob interface using the first resulting signals and the second resulting signals; obtaining, by the processing system and using the set of rotation electrodes, third resulting signals indicating a first rotational state of the knob interface, based at least in part on the knob interface being rotated from the initial state to a first rotational state; determining, by the processing system, the rotational direction of the knob interface using the first resulting signals, the second resulting signals, and the third resulting signals; and adjusting, by the processing system, a setting using the determined rotational direction.

In another exemplary embodiment, the present disclosure provides processing system for determining a rotational direction of a knob interface. The processing system comprises: one or more processors; and a non-transitory computer-readable medium having processor-executable instructions stored thereon, the processor-executable instructions, when executed by the one or more processors, facilitating performance of the following: obtaining, using a set of rotation electrodes that interact with the knob interface, first resulting signals and second resulting signals; determining an initial state of the knob interface using the first resulting signals and the second resulting signals; obtaining, using the set of rotation electrodes, third resulting signals indicating a first rotational state of the knob interface, based at least in part on the knob interface being rotated from the initial state to the first rotational state; determining the rotational direction of the knob interface using the first resulting signals, the second resulting signals, and the third resulting signals; and adjusting a setting using the determined rotational direction.

In yet another exemplary embodiment, the present disclosure provides a non-transitory computer-readable medium having processor-executable instructions stored thereon, the processor-executable instructions, when executed, facilitating performance of the following: obtaining, using a set of rotation electrodes that interact with a knob interface, first resulting signals and second resulting signals; determining an initial state of the knob interface using the first resulting signals and the second resulting signals; obtaining, using the set of rotation electrodes, third resulting signals indicating a first rotational state of the knob interface, based at least in part on the knob interface being rotated from the initial state to the first rotational state; determining a rotational direction of the knob interface using the first resulting signals, the second resulting signals, and the third resulting signals; and adjusting a setting using the determined rotational direction.

Further features and aspects are described in additional detail below with reference to the FIGs.

DETAILED DESCRIPTION

Figure 1:
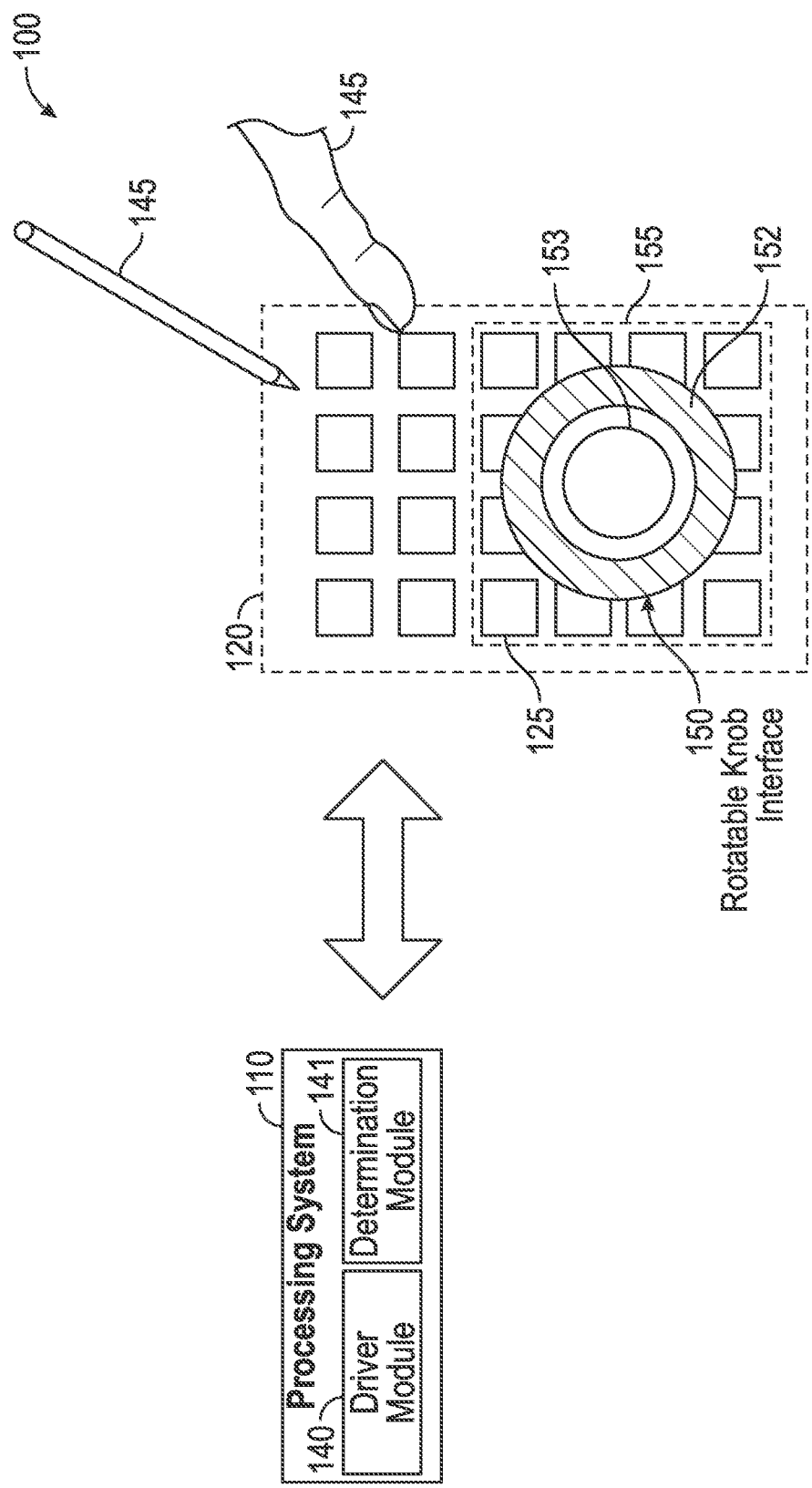
FIG. 1 illustrates an example input device with a rotatable knob interface according to one or more examples of the present disclosure.

The following detailed description is exemplary in nature and is not intended to limit the disclosure or the application and uses of the disclosure. Furthermore, there is no intention to be bound by any expressed or implied theory presented in the preceding background, summary and brief description of the drawings, or the following detailed description.

In the following detailed description, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Various examples of the present disclosure provide input devices and methods that determine a direction of the knob that is being rotated by a user after a single state (e.g., a single detent or a single resolution) instead of two or more states. For instance, the present disclosure determines the initial states of the knob sensing pads, which are used for detecting the rotation of the knob. The knob sensing pads may detect values of the sensing touch pixels underneath the knob sensing pads. These values may change depending on if the knob conductive pads are grounded. After determining the initial states of the knob sensing pads, the present disclosure may determine the initial states of the knob, and use the initial states of the knob to determine the direction of rotation after a single resolution.

For instance, traditionally, various applications (e.g., automotive applications) may use a quadrature encoder signal to detect rotation. There are four unique states for two different channels that are offset in position by a specified amount. As the user rotates the knob, a step signal is generated for each channel (e.g., "0" or Low and "1" or High). A direction of rotation may be determined by analyzing the signals from each channel. However, as mentioned above, traditional systems require the knob to be rotated by two states (e.g., two resolutions or two detents) before the system can determine the direction of rotation.

As such, the present disclosure determines the direction of rotation for the knob after the knob has been rotated by a single state (e.g., a single resolution or detent). For instance, by determining the initial state of the knob upon start-up, the present disclosure determines the direction of rotation of the knob after a single state of rotation, which reduces the number of detents required to identify direction from two states to a single state. Accordingly, among other advantages, because the input device of the present disclosure may determine a rotational direction of the knob after the knob has been rotated a single state, the present disclosure provides for a better user experience. For instance, the user may seek to adjust a setting (e.g., a volume or a fan speed) by a single state (e.g., reduce the volume from "15" to "14" or reduce the fan speed from "5" to "4"). However, for traditional systems, if the user rotates the knob by a single state, traditional systems would fail to determine whether to increase or decrease the setting (e.g., whether to reduce the volume from "15" to "14" or to increase the volume from "15" to "16). As such, aspects of the present disclosure may determine the direction of rotation for the knob after the knob has been rotated by a single state, which provides for a better user experience. An example knob interface is described in U.S. Pat. No. 10,921,913, titled "Rotatable knob interface," which is incorporated by reference in its entirety herein.

FIG. 1 is a block diagram depicting an electronic device (e.g., an input device) according to one or more examples of the present disclosure. The electronic device 100 may be configured to provide input to an electronic system, and/or to update one or more devices. As used herein, the term "electronic system" (or "electronic device" or "input device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional examples of electronic systems include composite input devices, such as physical keyboards that include the electronic device 100 and separate joysticks or key switches. Further examples of electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device. In other embodiments, the electronics system may be part of an automobile, and the electronic device 100 represents one or more sensing devices of the automobile. In some instances, an automobile may include multiple electronic devices 100, where each electronic device 100 may be configured differently from the other electronic devices.

The electronic device 100 may be implemented as a physical part of the electronic system, or may be physically separate from the electronic system. As appropriate, the electronic device 100 may communicate with parts of the electronic system using any one or more of the following: buses, networks, and other wired or wireless interconnections. Example communication protocols include Inter-Integrated Circuit (I²C), Serial Peripheral Interface (SPI), Personal System/2 (PS/2), Universal Serial Bus (USB), Bluetooth®, Radio Frequency (RF), and Infrared Data Association (IrDA) communication protocols.

In some variations, the electronic device 100 may utilize any combination of sensor components and sensing technologies to detect user input. For example, as show in FIG. 1, the electronic device 100 includes one or more electrodes 125 that may be driven to detect objects or update one or more devices. In some instances, the electrodes 125 are sensor electrodes of a capacitive sensing device. In such instances, the electrodes 125 include one or more common voltage electrodes. In other instances, the electrodes 125 are electrodes of an image sensing device, radar sensing device, and/or ultrasonic sensing device. Further yet, the electrodes 125 may be display electrodes of a display device. In some examples, the electrodes 125 of the electronic device 100 are comprised of the common electrodes and have a common shape. Some of the examples described herein include a matrix sensor input device. As described in detail below, electronic device 100 may be provided with a rotatable knob interface 150, which may interact with some or all of electrodes 125.

The sensor electrodes 125 may have any shape, size and/or orientation. For example, the sensor electrodes 125 may be arranged in a two-dimensional array as illustrated in FIG. 1. Each of the sensor electrodes 125 may be substantially rectangular in shape. In other examples, the sensor electrodes 125 may have other shapes. Further, each of the sensor electrodes 125 may have the same shape and/or size. In other examples, at least one sensor electrode may have a different shape and/or size than another sensor electrode. In some variations, the sensor electrodes 125 may be diamond shaped, have interdigitated fingers to increase field coupling, and/or have floating cut-outs inside to reduce stray capacitance to nearby electrical conductors.

In some instances, capacitive implementations may utilize "self-capacitance" (or "absolute capacitance") sensing methods based on changes in the capacitive coupling between sensor electrodes and an input object. In various examples, an input object near the sensor electrodes, such as, for example, finger or stylus 145, alters the electric field near the sensor electrodes 125, thus changing the measured capacitive coupling. In some instances, an absolute capacitance sensing method operates by modulating sensor electrodes with respect to a reference voltage (e.g., system ground), and by detecting the capacitive coupling between the sensor electrodes and input objects.

In some variations, capacitive implementations may utilize "mutual capacitance" (or "transcapacitance") sensing methods based on changes in the capacitive coupling between sensor electrodes. In some instances, an input object near the sensor electrodes alters the electric field between the sensor electrodes, thus changing the measured capacitive coupling. In some examples, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage, or modulated with reference to the transmitter sensor electrodes to facilitate receipt of resulting signals. A resulting signal may comprise effect(s) corresponding to one or more transmitter signals, and/or to one or more sources of environmental interference (e.g., other electromagnetic signals). Sensor electrodes may be dedicated transmitters or receivers, or may be configured to both transmit and receive.

Capacitive sensing devices may be used for detecting input objects in proximity to and/or touching input devices. Additionally, and/or alternatively, capacitive sensing devices may be used to sense features of a fingerprint. Additionally, and/or alternatively, as in the example of FIG. 1, capacitive sensing devices may be provided with a rotatable knob interface that is electrically coupled to the capacitive sensing device, and may be used to sense the rotary position of the rotary knob. In some examples that include the rotatable knob interface, the rotatable knob interface may have a home position and a compressed position, and the sensing device may also be used to determine when the rotatable knob is in the home position, and when it is in the compressed position, based on a change in capacitive coupling of one or more of electrodes 125.

The electronic device 100 further includes a processing system 110. The processing system 110 is configured to operate hardware of the electronic device 100. The processing system 110 comprises a driver module 140 (e.g., a driver device), which may include a signal generator. In some examples, the driver module 140 generates sensing signals with which to drive electrodes 125. In some instances, the processing system 110 comprises parts of or all of one or more integrated circuits (ICs) and/or other circuitry components In some variations, the processing system 110 also comprises electronically-readable instructions, such as firmware code, software code, and/or the like. In some instances, components of the processing system 110 are located together, such as, for example, near sensing element(s) of the electronic device 100. In other instances, components of processing system 110 are physically separate with one or more components in proximity to the sensing element(s) of electronic device 100, and one or more components elsewhere. For example, the electronic device 100 may be a peripheral coupled to a desktop computer, and the processing system 110 may comprise software configured to run on a central processing unit (CPU) of the desktop computer and one or more integrated circuits (ICs) (perhaps with associated firmware) separate from the CPU. As another example, the electronic device 100 may be physically integrated in a phone, and the processing system 110 may comprise circuits and firmware that are part of a main processor of the phone. Further yet, the processing system 110 may be implemented within an automobile, and the processing system 110 may comprise circuits and firmware that are part of one or more of the electronic control units (ECUs) of the automobile. In some examples, the processing system 110 is dedicated to implementing the electronic device 100. In other examples, the processing system 110 also performs other functions, such as operating display screens, driving haptic actuators, and/or performing other functions.

The processing system 110 may be implemented as one or more modules (e.g., devices) that operate different functions of the processing system 110 (e.g., driver module 140, or determination module 141). Each module may comprise circuitry that is a part of the processing system 110, firmware, software, or a combination thereof. In various instances, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes. In some instances, the electronic device 100 may be implemented as a chip, or as one or more chips. In some examples, the electronic device 100 may comprise a controller, or a portion of a controller, of electronic device 100.

In some instances, a display driver (e.g., driver module 140) may be configured for both display updating and input sensing, and may, for example, be referred to as including touch and display driver integration (TDDI) technology. In such instances, the driver module 140 may be implemented as a TDDI chip, or a portion of a TDDI chip. In some examples, the electronic device may include matrix sensor and may also include TDDI technology.

In some variations, the processing system 110 further includes a determination module 141 (e.g., a determination device). The determination module 141 may be configured to determine changes in a capacitive coupling between each modulated sensor electrode and an input object, such as input objects 145, from the resulting signals. In some instances, all of sensor electrodes 125 may be simultaneously operated for absolute capacitive sensing, such that a different resulting signal is simultaneously received from each of the sensor electrodes or a common resulting signal from two or more sensor electrodes. In other instances, some of the sensor electrodes 125 may be operated for absolute capacitive sensing during a first period and others of the sensor electrodes 125 may be operated for absolute capacitive sensing during a second period that is non-overlapping with the first period.

In some variations, the processing system 110 responds to user input (or lack of user input) directly by causing one or more actions. Example actions include changing operation modes, as well as graphic user interface (GUI) actions such as cursor movement, selection, menu navigation, and other functions. In some instances, the processing system 110 provides information about the input (or lack of input) to some part of the electronic system (e.g., to a central processing system of the electronic system that is separate from the processing system 110, if such a separate central processing system exists). In some examples, some part of the electronic system processes information received from the processing system 110 to act on user input, such as to facilitate a full range of actions, including mode changing actions and GUI actions. Further, in some examples, the processing system 110 is configured to identify one or more objects, and the distance to these objects. In some instances, the processing system 110 is configured to identify (determine) one or more rotational changes of knob interface 150, or one or more changes of state of knob interface 150, or both, and map those changes to desired actions. Additionally, and/or alternatively, the processing system 110 is configured to determine an initial state of the knob interface 150. Using the initial state of the knob interface 150, the processing system 110 is configured to determine a direction of rotation of the knob interface (e.g., clockwise or counterclockwise) after one state change of the knob interface 150 (e.g., after the user rotates the knob interface 150 by a single resolution or a single detent).

For example, in some instances, the processing system 110 operates electrodes 125 to produce electrical signals (resulting signals) indicative of input (or lack of input) in a sensing region. The processing system 110 may perform any appropriate amount of processing on the electrical signals in producing the information provided to the electronic system. For example, the processing system 110 may digitize analog electrical signals obtained from the electrodes 125. As another example, the processing system 110 may perform filtering or other signal conditioning, or, as yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, recognize fingerprint information, distance to a target object, and the like.

It should be understood that while many examples of the disclosure are described in the context of a fully functioning apparatus, the mechanisms of the present disclosure are capable of being distributed as a program product (e.g., software) in a variety of forms. For example, the mechanisms of the present disclosure may be implemented and distributed as a software program on information bearing media that are readable by electronic processors (e.g., non-transitory computer-readable and/or recordable/writable information bearing media readable by the processing system 110). Additionally, and/or alternatively, examples of the present disclosure apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

In some instances, the processing system 110 is configured to generate a voltage signal to drive the electrodes 125 during a display update interval and an input sensing interval, respectively. In such instances, the voltage signal generated to drive the electrodes 125 during a display update interval is a substantially constant, or fixed voltage, and the voltage signal generated to drive the electrodes 125 during an input sensing interval may be referred to as a sensing signal, having a waveform with a periodically variable voltage. In some examples, the value of a voltage signal to drive the electrodes 125 during a display update interval may be predetermined. For example, the voltage value may be provided by a manufacturer of electronic device 100 and/or the electrodes 125, and may be device-specific to electronic device 100.

In some instances, the driver module 140 comprises circuitry configured to provide the sensing signal. For example, the driver module circuitry may include an oscillator, one or more current conveyers and/or a digital signal generator circuit. In some examples, the circuitry of the driver module 140 generates the voltage signal based on a clock signal, the output of the oscillator and the parameters discussed above.

As noted above, in some instances, the driver module 140 generates a signal to drive the electrodes 125 during each of the display update periods and input sensing update periods. In such instances, an input sensing update period is provided in between two display update periods, and is of a shorter duration than a display update period. In such instances, there are several display update periods and input sensing update periods per display frame. In some examples, by acquiring the resulting signals over successive input sensing periods, the rotation of the rotatable knob interface 150, as well as whether it is in its home state or compressed state, may be tracked.

As noted above, in some variations, an additional input apparatus may be provided on top of the display panel 120 of the electronic device 100, such as, for example, the rotatable knob interface 150, and may be electrically coupled to some or all of electrodes 125 that are positioned near or below it. In some instances, the additional apparatus may provide alternate ways for a user to provide input to electronic device 100 other than touching, or hovering near, a display screen with a finger or stylus 145. In the depicted example of FIG. 1, the rotatable knob interface 150 is mounted onto the display panel 120, and may have a full (as shown in FIG. 1) or partial overlap with the display panel 120. As noted, in one or more examples, the rotatable knob interface 150 may have a stationary base that is provided with various sets of coupling electrodes configured to couple with respective sets of electrodes of the display panel 120, such as one or more sets of electrodes that are provided with sensing signals and one or more sets of electrodes that are provided with reference signals. In some variations, the stationary base may include different conductive regions respectively connected to corresponding sets of coupling electrodes.

In some instances, the rotatable knob interface 150 also includes a rotary wheel that sits above, and rotates relative to, the stationary base. In such instances, an underside of the rotary wheel is patterned with various conductive and non-conductive regions in a peripheral region 152, configured to align with the conductive regions of the stationary base so that there are various electrical couplings between the conductive regions of the stationary base and the various conductive and non-conductive regions in the peripheral region 152 of the rotary wheel. These components are further configured such that these electrical couplings change as the rotary wheel is rotated, in such manner that by detecting the effects of the changes in the electrical couplings on resulting signals received on the display panel, the electronic device 100 (e.g., the input device) may determine a rotation, or a change in rotation, of the knob interface 150. In some instances, the patterned region 152 may have numerous possible example arrangements of the conductive and non-conductive regions, and there may be various ways of having the rotary wheel and the stationary base electrically interact as the rotary wheel is rotated. Thus, alternate configurations and relative arrangements of both the conductive regions of the stationary base, and the placement of the conductive and non-conductive regions of the rotary wheel are possible, all being within the scope of this disclosure.

In some examples, the rotation imparted to the rotatable knob interface by a user, in either relative or absolute terms, may be detected by the electronic device 100. In some instances, the rotatable knob interface 150 may also be pressed downwards by a user, and may thus have two positions: a home or "uncompressed" position, and a "compressed" position, which a user maintains by, for example, pushing down on the knob interface 150 against one or more biasing springs. In some instances, the rotatable knob interface 150 has a cover. In some variations, the rotatable knob interface may be pressed downwards so as to rest at multiple positions, and thus may have multiple states between an "uncompressed" and a "fully compressed" position. In the home position, the cover is at a greater distance above the rotary wheel than in the compressed position. In some variations, the rotary wheel may have several switches provided between the rotary wheel and the cover, and these switches may include biasing springs. In such variations, the rotatable knob interface 150 may be provided with a fourth set of coupling electrodes, which couple to electrodes of the input device that are also driven with sensing signals. In the example of FIG. 1, the fourth set of coupling electrodes is connected to an inner ring provided in the stationary base, which aligns with a similarly shaped inner ring 153 that is provided in the rotary wheel. In such examples, when a user presses down on the cover of the rotatable knob interface, so that the rotatable knob interface 150 is then in the "compressed" position, the switches close so as to connect the inner ring 153 of the rotary wheel with all of the conductive regions provided in patterned region 152. This serves to electrically couple the fourth set of coupling electrodes of the stationary base to the first set of coupling electrodes of the stationary base, thereby coupling a corresponding fourth set of electrodes of the display panel to a reference signal. However, when the user ceases to press down on the cover, the fourth set of coupling electrodes of the knob interface simply floats. In some instances, the direction and degree of rotation, as well as a user pressing down on, or ceasing to press down upon, the rotatable knob interface 150, may be interpreted by processing system 110, such as, for example, by the determination module 141, and may be mapped to various user input actions, signals, or directives.

In some instances, a user may rotate the rotatable knob interface 150 in various ways, for example, grabbing an outer housing of the rotatable knob interface and turning it, grabbing a top of the rotatable knob interface, or a flange protruding from the side of the rotatable knob interface and turning it, or placing one or more fingertips in or on a recessed channel on an upper surface of the rotatable knob interface.

In some instances, the electronic device 100 of FIG. 1 may be provided in an automobile. For example, the electronic device 100 may be affixed to a substantially vertical display screen provided in a central part of a dashboard. In some variations, all the electrodes not physically blocked by the rotatable knob interface 150, whether the electrodes 125 are inside or are outside of region 155 (described below), remain active. Thus, in such variations, both touches away from the knob, and rotations of the knob, are detected and reported by the electrodes 125 at the same time.

In some examples, all other forms of user input besides those received via the rotatable knob interface 150 may be disabled on the electronic device. Thus, in such examples, the electrodes 125 are not driven during the sensing interval to perform their standard sensing functionality. As a result, if a finger or other object 145 is moved into, or away from, its vicinity, no resulting signal is obtained, or if obtained, it is not processed. In such examples, this may be done to prevent a driver of the automobile from attempting to touch the display 120 while driving, as a safety measure, and thus to only interact with the electronic device 100 via the rotatable knob interface 150. In such examples, the disabling of standard sensing functionality of the electrodes 125 may be implemented during specified activities of the automobile, but not during others. For example, the disabling of standard sensing functionality of the electrodes 125 may be implemented while the automobile is in actual motion, but at all other times some of the electrodes 125, for example, those not near enough to the rotatable knob interface to interfere with signals acquired from it, may be operated to perform standard sensing, as described above.

In some instances, when all of the electrodes 125 are disabled from standard sensing, whether during actual driving of the automobile, or whether at all times, as the case may be, the only way that a driver of the automobile can provide input to the electronic device 100 is via the rotatable knob interface 150, using a pre-defined set of rotations and/or pressings of the rotatable knob interface 150. These motions modify a resulting signal which is received by the electronic device 100 during a sensing period, which then interprets them, for example, using determination module 141. The resulting signal may be the same signal as the sensing signal that driver module 140 drives an electrode 125 with, after being modified by the capacitive coupling of the rotary knob interface 150.

In some instances, for example, only some of the electrodes 125, in particular those that are near or beneath the rotary knob interface 150, are disabled from standard capacitive sensing, and the remainder of the electrodes 125 on the electronic device 100 may still be operative for standard capacitive sensing. In such instances, the electrodes that are disabled for standard capacitive sensing are those that are close enough to the rotatable knob interface 150 such that driving them with standard sensing signals may interfere with the resulting signals obtained from various sets of the electrodes 125 that are respectively electrically coupled to the coupling electrodes of the rotatable knob interface 150. To illustrate this feature, in FIG. 1, there is shown a dashed line boundary 155. Electrodes 125 within the boundary 155 are in a "blackout zone" and not driven with a standard sensing signal. Rather, as described in detail below, any of the electrodes within the blackout zone that are electrically coupled to the rotatable knob interface are driven so as to capture rotations and compressions of the rotatable knob interface, as described below.

In general, within the blackout zone, a first, second and third set of the electrodes 125 are coupled to corresponding first, second and third sets of the coupling electrodes of the stationary base of the rotatable knob interface 150. In some instances, the first set are driven with a reference signal, and the second and third sets are driven with a sensing signal to obtain a resulting signal modified by the then extant relative rotational relationship of the stationary base and the rotary wheel of the rotatable knob interface 150. Thus, in each of these instances, the electrodes within the blackout zone boundary 155 may be disabled from standard capacitive sensing at all times.

Furthermore, as noted above, sets of electrodes of the electronic device 100 are electrically coupled to corresponding sets of coupling electrodes of the rotatable knob interface 150. Thus, during an input sensing period, a reference signal is supplied by the driver module 140 to a first set of the electrodes 125, and a sensing signal is supplied to second and third sets of the electrodes 125. In some instances, the reference signal may be a configurable direct current (DC) output provided by the processing system 110. In some examples, the DC signal may be a ground signal of the electronic device 100. In some variations, a resulting signal is obtained from each of the second and third sets of the electrodes 125, where the resulting signals is the sensing signal as modified by the rotational state of the rotatable knob interface 150. The resulting signals are interpreted by the determination module 141 to determine a rotation of the rotatable knob interface 150. For instance, using the resulting signals, the processing system 110 may determine a number of states (e.g., detents or resolutions) that the user has rotated the rotatable knob interface 150 as well as the direction of the rotation. Furthermore, upon start-up (e.g., any time prior to the user rotating the knob interface 150), the processing system 110 may determine an initial state of the rotatable knob interface 150. For instance, the processing system 110 may obtain resulting signals from the second and third set of electrodes. Based on comparing the resulting signals from multiple frames, the processing system 110 may determine an initial state of the knob interface 150. Subsequently, the processing system 110 may determine a new state of the knob interface associated with the user rotating the knob interface 150. By comparing the initial state of the knob interface 150 and the new state of the knob interface 150, the processing system 110 may determine the direction of rotation of the knob interface 150. Thus, the processing system 110 does not need two separate states of rotation of the knob interface 150 to determine the direction as the processing system 110 uses an initial state of the knob interface 150 (e.g., a state when the knob interface 150 has not been rotated) and one additional state of the knob interface 150 during rotation by a user to determine the direction of rotation.

Additionally, and/or alternatively, the processing system 110 may obtain additional resulting signals from additional sensing electrodes associated with the knob interface 150. For instance, in-between the first set of electrodes and the second/third sets of electrodes, there may be an empty column of sensing pixels (e.g., the empty column 412 from FIG. 4A below) that are coupled to one or more sensing electrodes. Using the resulting signals from these sensing electrodes as well as the resulting signals from the second and/or third set of electrodes, the processing system 110 determines an initial state of the knob interface 150. Using the initial state of the knob interface 150 and an additional state of the knob interface 150, the processing system 110 determines the direction of rotation of the knob interface 150. This will be explained in further detail below.

Figure 2:
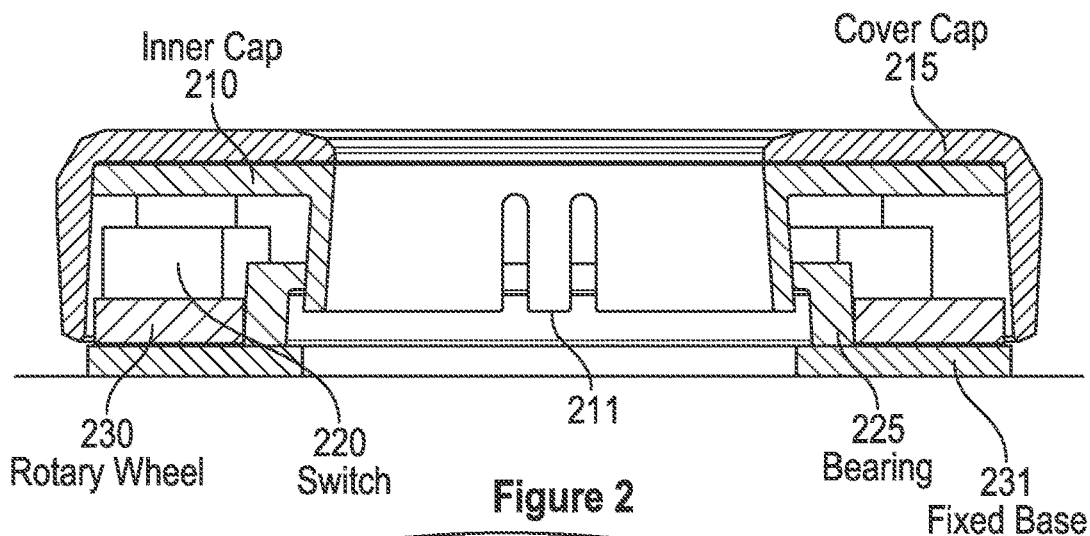
FIG. 2 illustrates a cross-sectional side view of an example rotatable knob interface according to one or more examples of the present disclosure.
Figure 3:
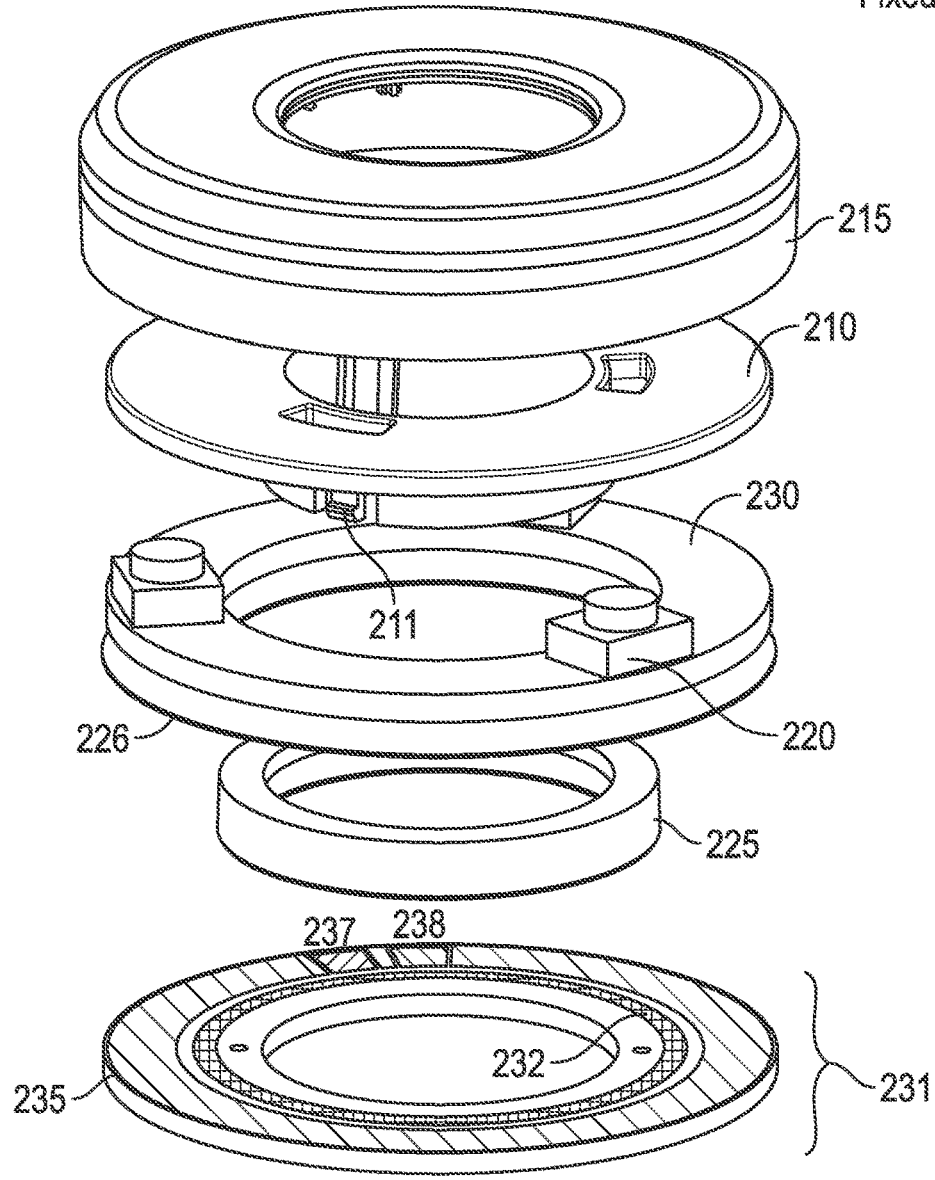
FIG. 3 illustrates an exploded view of the example rotatable knob interface of FIG. 2 according to one or more examples of the present disclosure.

FIG. 2 illustrates a cross-sectional side view of an example rotatable knob interface according to one or more examples of the present disclosure. For instance, starting at the bottom, the rotatable knob interface includes a fixed base 231. In some instances, the fixed base 231 does not move as a user rotates the example knob interface. Thus, in some examples, the fixed base 231 is affixed to the surface of an example input device, such as, for example, by an adhesive. In some variations, the fixed base 231 is affixed to the input device in a semi-permanent or permanent manner, and is placed thereon so as to align with a grid of electrodes provided in the input device. Provided above the fixed base 231 is a rotary wheel 230. The rotary wheel 230 turns as a user rotates the knob interface, such as, for example, by grasping and turning cover cap 215, as described below. At an inner side of the rotary wheel 230 is provided a vertical ring bearing 225. The vertical ring bearing 225 is non-conductive, and may be made of plastic, for example, and may have the shape of a ring. Vertical ring bearing 225 may have a substantially tubular shape. Not shown in FIG. 2, but described below with reference to FIG. 3, is an additional substantially horizontal ring-shaped bearing upon which the rotary wheel 230 sits according to one or more examples of the present disclosure. By using both of the bearings, frictional forces between the fixed base 231, and the rotary wheel 230 may be reduced.

Continuing with reference to FIG. 2, provided on top of rotary wheel 230 are one or more switches 220. For example, switches 220 may be dome switches. There may be three switches 220, and the switches may be equidistantly placed on an upper surface of rotary wheel 230. In one or more examples, the switches are used to distinguish between two states of the knob interface such as a compressed state, in which the switches are closed, and an uncompressed state in which the switches remain open. The compression state of the knob interface is orthogonal to its internal rotational position. Thus, the knob interface may be rotated while in either a compressed or an uncompressed state (and in any position in between the two states), and that rotation may be sensed and measured. Similarly, the state of the switches as being open or closed, corresponding respectively to the knob interface being in the "home" or uncompressed state, or in the compressed state, may be detected whether or not the rotatable knob interface is rotationally stationary or being rotated.

Furthermore, the knob interface has an inner cap 210 and a cover cap 215. In operation, a user physically interacts with cover cap 215, for example, by grasping cover cap 215 and rotating the rotary wheel 230 relative to the fixed base 231, or by pushing down on cover cap 215 to compress the knob interface and close the switches 220. As shown, the inner cap 210 is attached, by prongs 211, to a lip provided on the inner surface of vertical ring bearing 225. The cover cap 215 is attached to the inner cap 210, such that turning the outer cap 215 rotates the rotary wheel 230.

FIG. 3 shows an exploded view of the example rotatable knob interface of FIG. 2, and illustrates the upper side of various components. Beginning at the bottom, FIG. 3 shows the upper surface of the fixed base 231. The upper surface is provided with a conductive peripheral ring 235, to be coupled to a reference signal of an input device to which the rotary knob is to be attached. As shown, the upper surface also shows an inner conducting ring 232 as well as two conductive pads 237 and 238. In some instances, these three conductive regions are configured to be coupled to a sensing signal of the input device. Details of these regions, their functions, and how they interact with the input device upon which the rotary knob sits, are described in greater detail below.

FIG. 3 further shows the vertical ring bearing 225, and a horizontal ring-shaped bearing 226, configured to slide over it. In some instances, because the fixed base 231 has a smaller inner diameter than the rotary wheel 230, there is a ledge at the inner periphery of the fixed base 231 upon which the vertical ring bearing 225 may sit. The vertical ring bearing 225 is thus configured to fit inside the inner diameter of the horizontal ring bearing 226, and rest upon the inner periphery of the fixed base 231. The two bearings thus provide a physical interface between the fixed base 231 and the rotary wheel 230, as noted above, which reduces friction between them as the rotary wheel 230 is moved.

FIG. 3 further shows three switches 220 provided around the upper surface of rotary wheel 230. As noted, these switches may be dome switches, for example. Above the switches 220 is shown the inner cap 210, which is configured to fit inside the vertical ring bearing 225, and be secured to the vertical ring bearing 225 by means of three prongs 211, which, in one or more examples are also placed equidistantly around the inner vertical surface of the vertical ring bearing 225. As shown, the inner cap 210 has a substantially horizontal upper ring, and a lower hollow cylindrical shaped portion. Thus, in some instances, the outer diameter of the lower cylindrical shaped portion of the inner cap 210, is designed to fit within an inner diameter of the vertical ring bearing 225, and then clamp to the bottom surface of the vertical ring bearing 225 by the prongs 211, which slightly protrude under such bottom surface when the inner cap 210 is in the home or uncompressed position. Further, the cover cap 215 is attached to the upper ring portion of the inner cap 210.

Figure 4A:
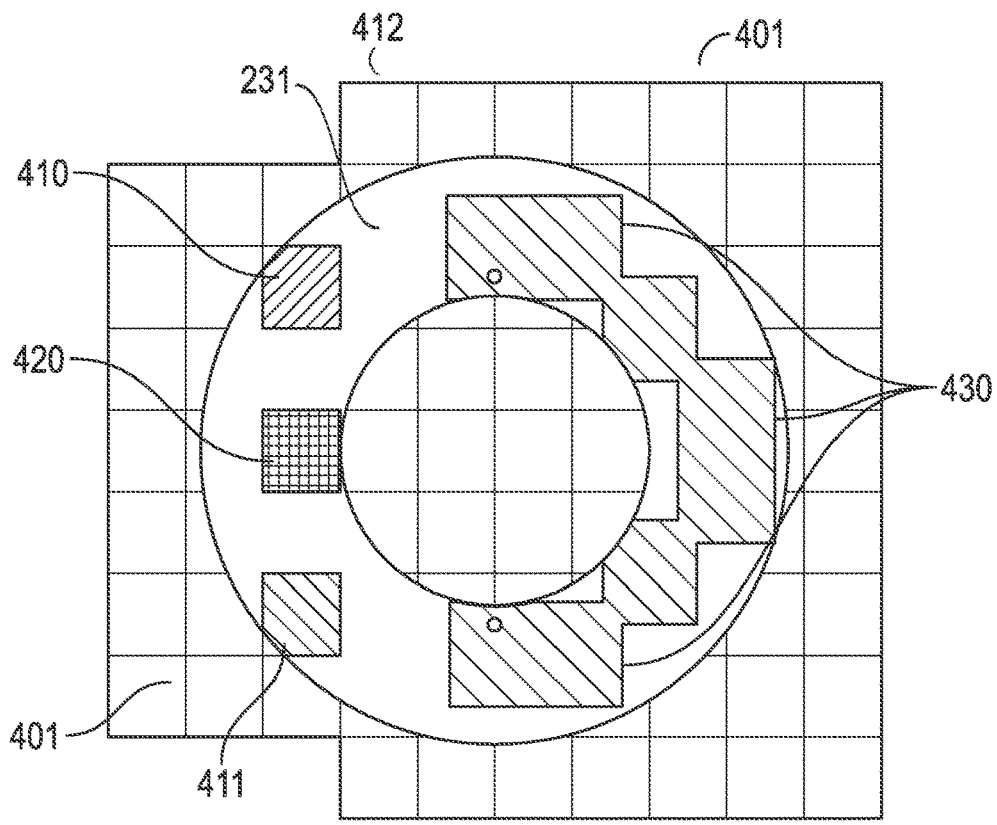
FIG. 4A illustrates an underside view of the fixed base of an example rotatable knob interface as shown in FIG. 3 with a first set of reference electrodes and two sets of sensing electrodes according to one or more examples of the present disclosure.
Figure 4B:
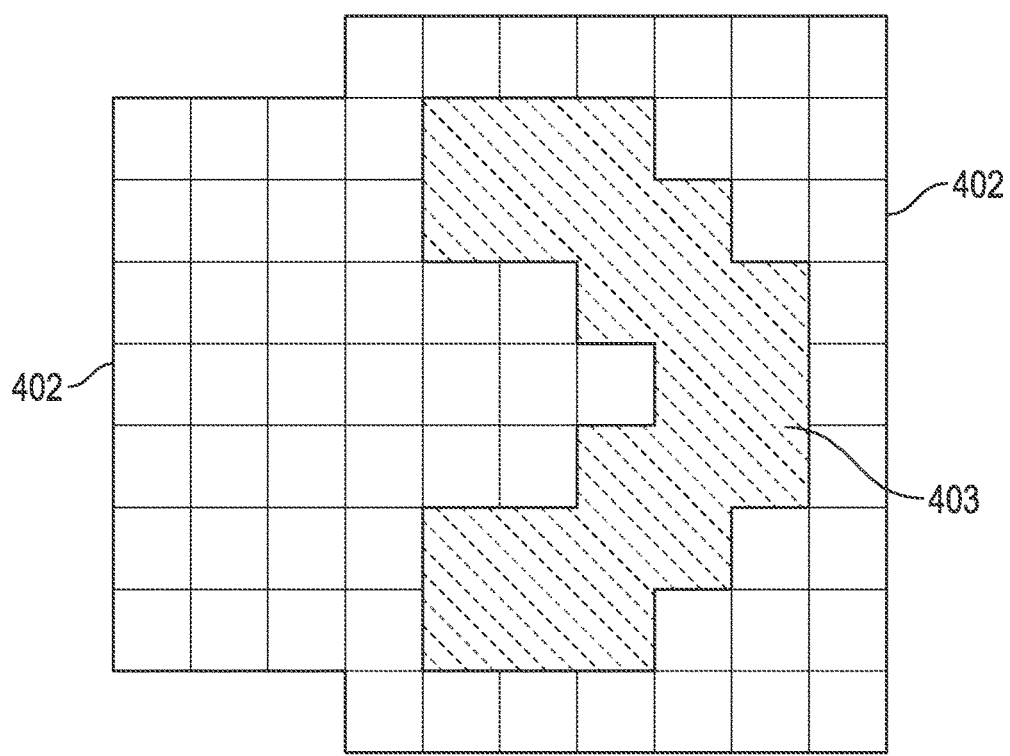
FIG. 4B illustrates an example portion of an input device with an electrode grid with two sets of electrodes according to one or more examples of the present disclosure.
Figure 4C:
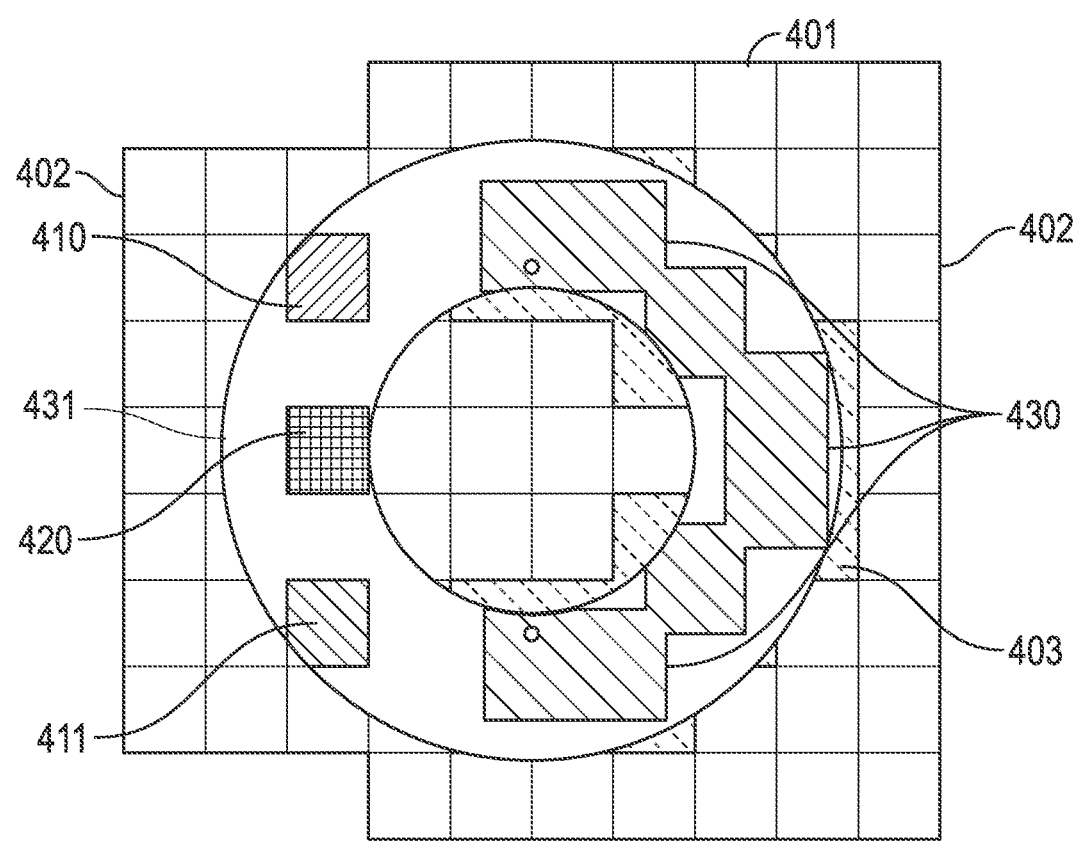
FIG. 4C illustrates the fixed base of an example rotatable knob interface of FIG. 4A as positioned over the example sensor grid of FIG. 4B according to one or more examples of the present disclosure.

FIG. 4A illustrates an underside view of the fixed base of an example rotatable knob interface as shown in FIG. 3 with a first set of reference electrodes and two sets of sensing electrodes according to one or more examples of the present disclosure. FIG. 4B illustrates an example portion of an input device with an electrode grid with two sets of electrodes according to one or more examples of the present disclosure. FIG. 4C illustrates the fixed base of an example rotatable knob interface of FIG. 4A as positioned over the example sensor grid of FIG. 4B according to one or more examples of the present disclosure. For instance, FIGS. 4A-4C illustrate the spatial relationships between coupling electrodes provided on the bottom surface of the fixed base 231, respectively connected to corresponding conducting regions on the top surface of the fixed base 231, and electrodes in a grid provided in an example input device.

For example, FIG. 4A illustrates a view of the underside of the fixed base 231 of an example rotatable knob interface shown in FIG. 3, superimposed over a grid of electrodes 401 of an example input device according to one or more examples of the present disclosure. For example, the bottom or underside of fixed base 231 has three sets of electrodes. A first set 430, shown as shaded, is a connected set of electrodes configured to receive a reference signal from the input device. Three electrodes 410, 420, 411, which are grouped into the remaining two sets, are configured to receive sensing waveforms of the input device. The second set, which includes electrodes 410 and 411, is configured to sense rotation of the knob interface as well as determine an initial state of the knob interface. The third set, which includes electrode 420, is configured to sense a "click" or the closing of the switches 220, for example, when a user pushes the knob interface into its compressed state. In some instances, sensing electrodes 410, 411 and 420 are designed to each overlap with, to the extent possible, a full input device electrode (e.g., a square) of grid 401. On the other hand, the set of electrodes 430 may be designed to each overlap portions of multiple electrodes of grid 401, but not full electrodes, such that the set of electrodes 430 only picks up the signal from the corresponding reference electrodes 403 (see FIG. 4B) on the grid 401 on the upper surface of the example input device, and do not pick up any parasitic capacitance from neighboring sensing electrodes. This isolation is illustrated in FIG. 4A by two features. First, there is an empty column 412 of sensing pixels to the right of sensing electrodes 410, 411 and 420 that provides a gap between the sensing electrodes 410, 411 and 420, and the set of electrodes 430. Second, the set of electrodes 430 (full line shading) are each recessed inwardly relative to the reference electrodes 403 (shaded with dotted lines) by, for example, 1.5-2 millimeters (mm). This recessing helps the set of electrodes 430 to only pick up the reference electrode signal and much less so of the parasitic coupling of nearby sensing signals on sensing electrodes 402. Further, this feature also helps with tolerance alignment of the example rotatable knob interface to the input device.

FIG. 4B illustrates the example grid 401 of FIG. 4A divided into two types of electrodes, according to one or more embodiments. In general, each electrode of an input device's grid may be selectively chosen to be driven with a sensing waveform or a reference signal, such as, for example, ground, or other reference signal. In some instances, to coordinate its grid with the electrodes of the underside of a fixed base, as shown in FIG. 4A, the input device's grid may be arranged as shown in FIG. 4B. Thus, grid electrodes 403, shaded in FIG. 4B, may be driven by the input device with a reference signal, and grid electrodes 402 may be driven by the input device with a sensing signal. In some examples, when this scheme is implemented, there is a pairing between the underside of the fixed base 231, and the electrodes of grid 401 of an input device. This is illustrated in the superimposed view of FIG. 4C.

FIG. 4C thus illustrates the underside of fixed base 231 of FIG. 4A as positioned over the example input device electrode grid 401 of FIG. 4B according to one or more examples of the present disclosure. As shown, the sensing electrodes 410, 411 and 420, configured for sensing on the knob interface, are each substantially fully aligned with grid electrodes 402, to be driven with sensing waveforms. In some instances, they are driven with the same sensing waveforms. Similarly, the set of electrodes 430, configured for coupling to a reference signal of the input device, are each provided above multiple grid electrodes 403, to be driven with a reference signal by the input device. In some instances, because the fixed base 231 is stationary, and fixed in position relative to the input device, it is first aligned to the electrodes of the input device, as shown, and then, in some examples, permanently attached to a glass surface of the input device.

Figure 5:
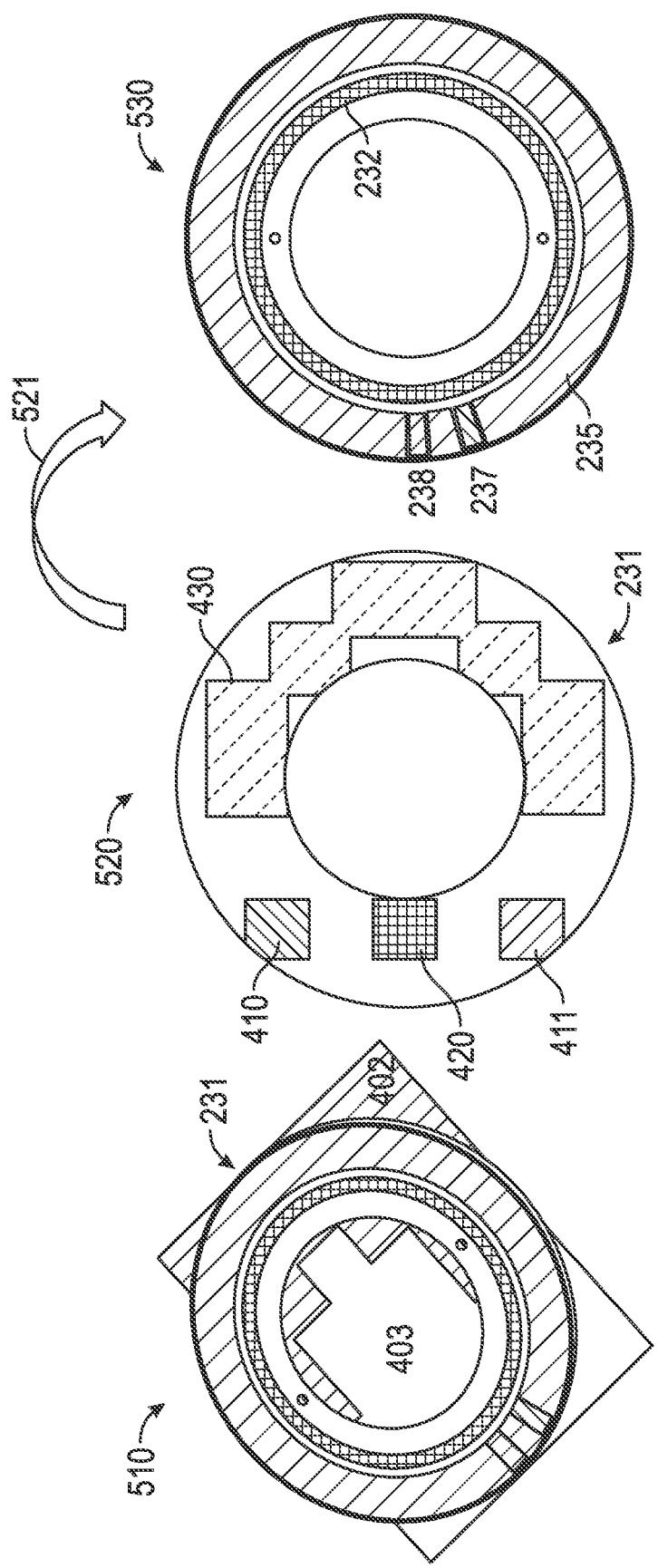
FIG. 5 illustrates a perspective top view, a bottom view, and another top view of the example fixed base of FIGS. 3 and 4A through 4C according to one or more examples of the present disclosure.

FIG. 5 shows the upper surface of the fixed base according to one or more examples of the present disclosure. For instance, the top perspective view 510 illustrates the positions of input device electrode regions 402 and 403 relative to the top surface of fixed base 231. As shown in the top perspective view 510, as well as by comparing bottom surface view 520 with another top view 530, the top surface of fixed base 231 is somewhat differently organized than its bottom surface. To fully appreciate the relative positions of conductive pads on the top and bottom surfaces, bottom surface view 520 is also shown, and, as indicated by the curved arrow 521, a corresponding position of the top surface is also shown by the top view 530. This top view 530 is what would be seen if the fixed base 231 as shown in bottom surface view 520 was flipped about a horizontal axis (such that right and left sides of the fixed base 231 are the same in views 520 and 530, respectively).

The top view 530 illustrates four conductive regions, namely the inner ring 232 (used to sense whether the switches are open or closed), the two conductive pads 237 and 238 (used to sense rotation) and peripheral ring 235. In some instances, each of these is electrically connected to a corresponding conductive region on the bottom surface of fixed base 231. For instance, peripheral ring 235 is electrically connected to a corresponding set of electrodes 430, as noted above, to couple to input device electrodes driven with a reference signal; the two conductive pads 237 and 238 are respectively connected to sensing electrodes 410 and 411; and inner ring 232, is electrically connected to sensing electrode 420. In some examples, as noted above, both conductive pads 237 and 238, as well as inner ring 232 are configured to couple to input device electrodes that are driven with a sensing signal.

Thus, as shown, the top of fixed base 231 has, on its outer periphery, two small conductive pads 237 and 238 near each other, surrounded by a peripheral ring 235. The peripheral ring 235 receives a reference signal, and the two pads 237 and 238 each receive a sensing signal. The two pads are used to sense rotation. A second, thinner ring 232 inside of the peripheral ring 235 is configured to also receive a sensing signal to sense whether the switches are closed. The closing of the switches may also be referred to as a "click" from the sound they make when they close.

Figure 6A:
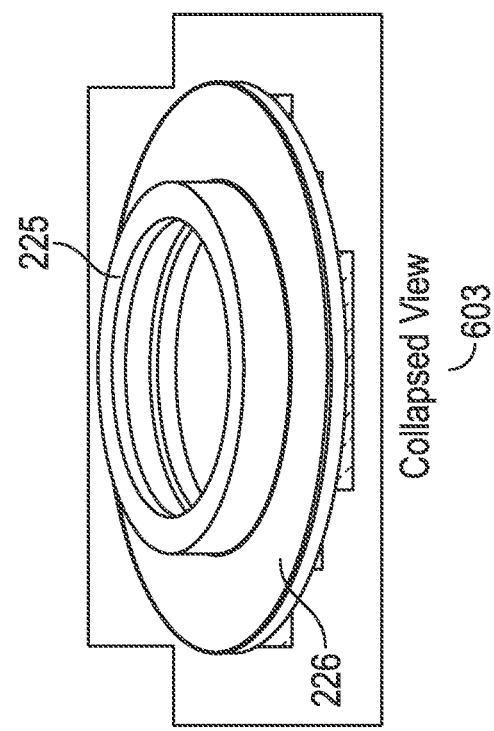
FIG. 6A illustrates exploded and collapsed views of the example fixed base and example plastic bearings shown in FIG. 3 according to one or more examples of the present disclosure.
Figure 6A:
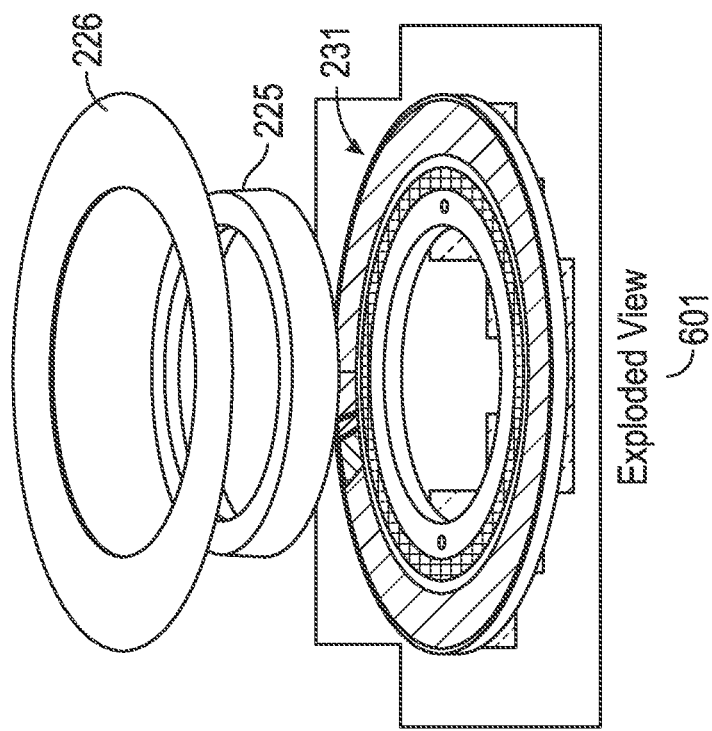

FIG. 6A illustrates an exploded view 601 and a collapsed view 603 of the example fixed base 231, the example vertical ring bearing 225, and the horizontal ring bearing 226 (e.g., plastic bearing) shown in FIG. 3. As is shown in the collapsed view 603, the horizontal ring bearing 226 has a smooth surface on top of which the rotary wheel 230 can rest, and the vertical ring bearing 225 has a smooth outer cylindrical structure around which the rotary wheel 230 can turn.

Figure 6B:
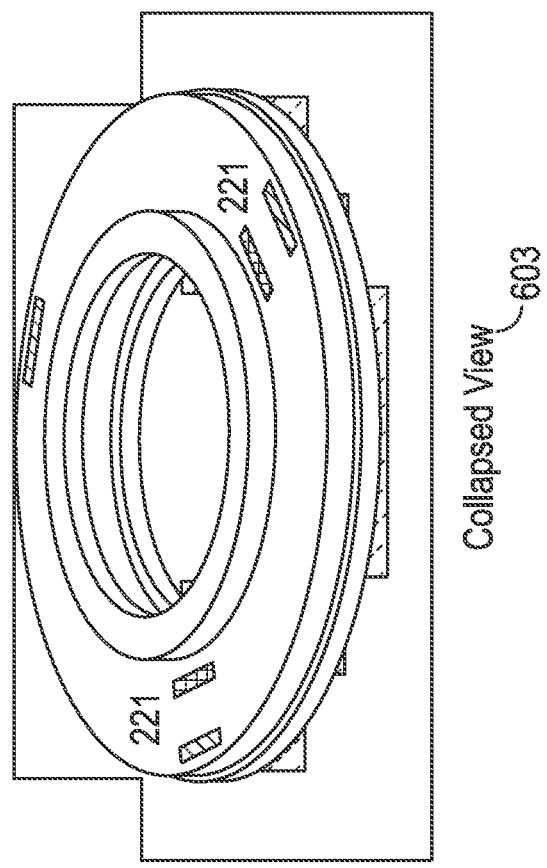
FIG. 6B illustrates the respective exploded and collapsed views shown in FIG. 6A, with the addition of the example rotary wheel of FIG. 3 provided on top of an example flat ring-shaped bearing according to one or more examples of the present disclosure.
Figure 6B:
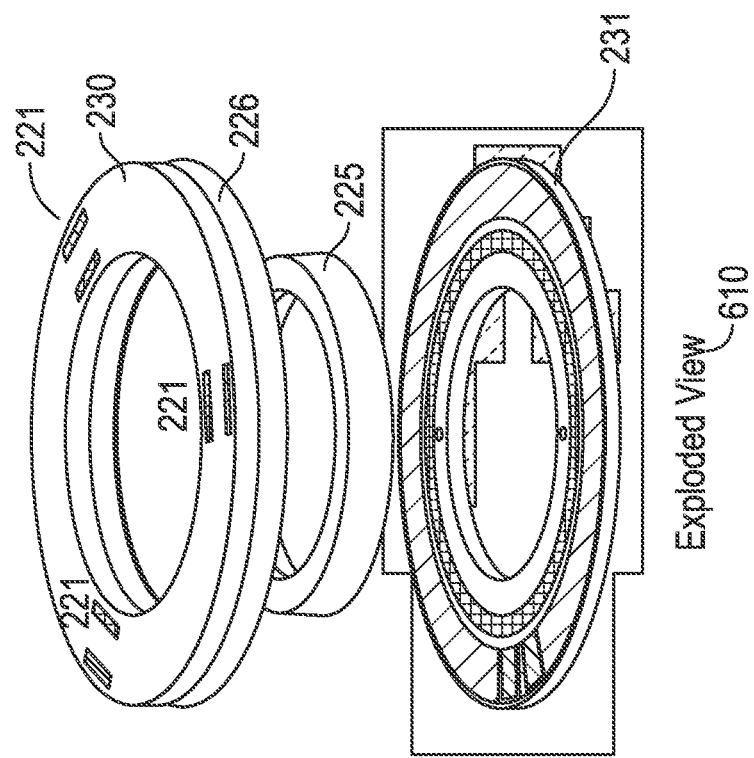

FIG. 6B illustrates the respective exploded view 610 and collapsed view 603 of the example fixed base 231 and the bearings 225, 226 shown in FIG. 6A, with the addition of the example rotary wheel 230 of FIG. 3 provided on top of an example flat ring-shaped bearing 226. As shown, the vertical ring bearing 225 has a larger height than that of the rotary wheel 230, such that it protrudes above the rotary wheel 230. Visible in each of exploded view 610 and collapsed view 603, are the three sets of pads 221 provided on a top surface of the rotary wheel 230 for connection to the set of switches.

Figure 7A:
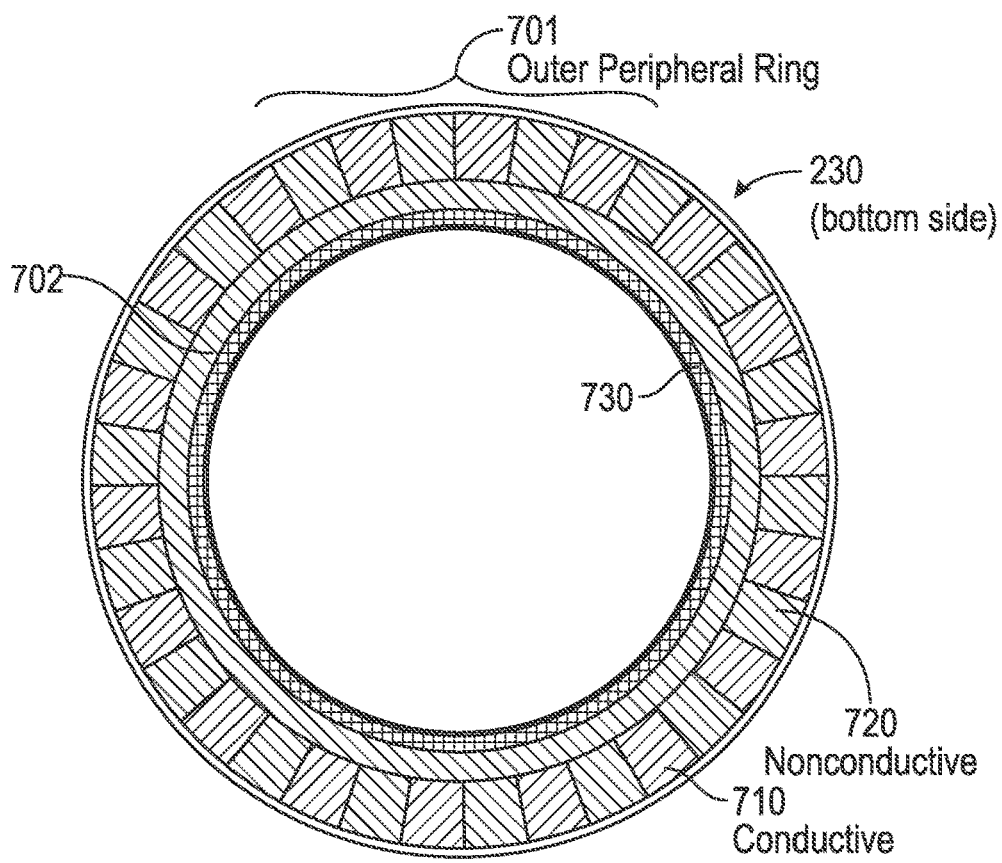
FIG. 7A illustrates a detailed bottom view of the rotary wheel of FIG. 3 according to one or more examples of the present disclosure.

FIG. 7A illustrates a detailed bottom view of the rotary wheel of FIG. 3. For instance, as in the case of the top surface of the fixed base, there are essentially two ring shaped structures—an outer peripheral ring 701, which comprises alternating first conductive regions 710 and non-conductive 720 regions, and an inner ring which comprises a single connected second conductive region 730. Furthermore, the ring-shaped region 702, provided between the outer peripheral ring 701 and the inner ring second conductive region 730, is also non-conductive. In some instances, the first and second conductive regions 710, 720 are used to sense rotation, and the inner ring second conductive region 730 is used to sense "click."

Figure 7B:
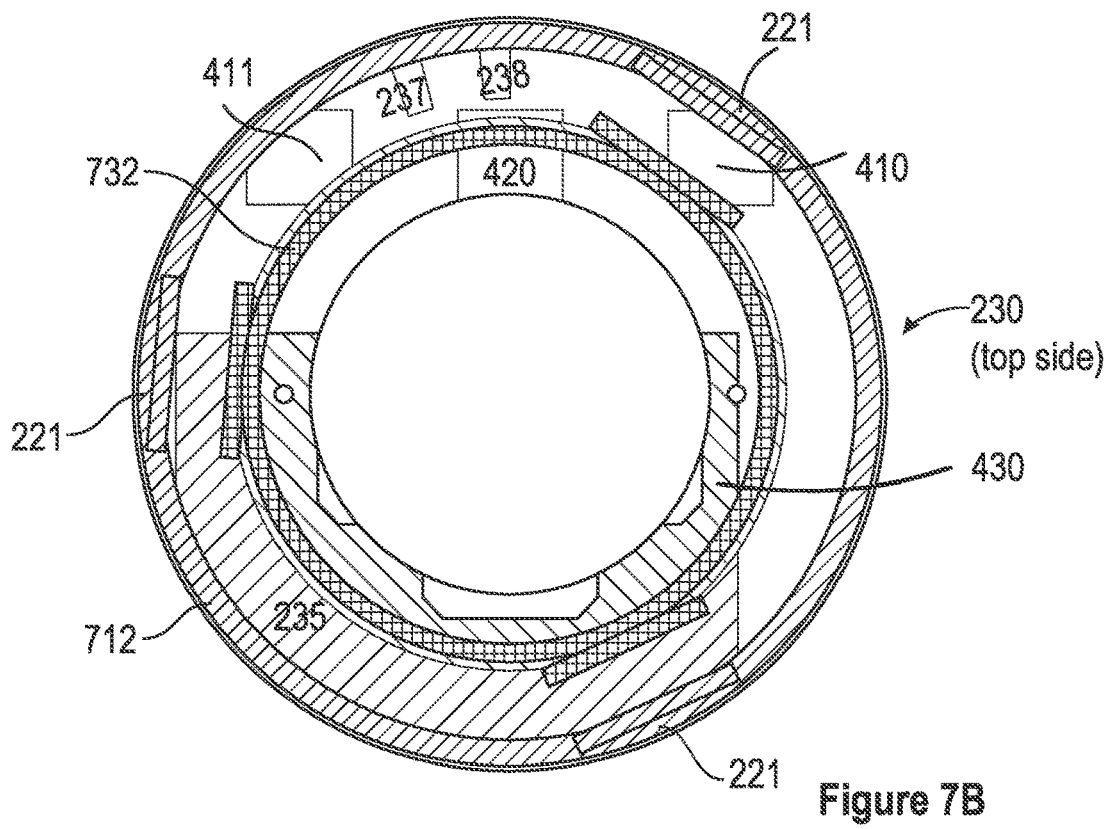
FIG. 7B illustrates a detailed top view of the rotary wheel of FIG. 7A according to one or more examples of the present disclosure.

FIG. 7B illustrates a detailed top view of the example rotary wheel of FIG. 3. The view of FIG. 7B corresponds to the view of the top surface of rotary wheel 230 shown in FIG. 6B that illustrates three sets of pads 221, which each respectively connect to a switch. As noted above, the switches may be dome switches, for example. However, the top view of FIG. 7B is drawn transparently, to show the underlying conducting rings to which each set of pads 221 is respectively coupled, as well as the other conductive regions on the bottom and top surfaces of the fixed base, previously described. These include, as shown here via the transparency, and as shown in FIG. 4A, on the bottom surface of fixed base 231, sensing electrodes 410, 420 and 411 and the set of electrodes 430 that is coupled to a reference signal of the input device; and on the top surface of fixed base 231, a portion of peripheral ring 235, and conductive pads 237 and 238.

In some instances, the conductive regions 710, as well as conductive pads 237 and 238, and peripheral ring 235, may be made of known conductors, such as, for example, copper, silver, gold, aluminum, or other conductors, or, for example, various alloys of any of those, with each other, or with different elements or compounds. Similarly, in some examples, non-conductive regions 720 may be regions of a printed circuit board or substrate on which no metal is deposited, and thus be made of epoxy plastic and fiberglass, for example, or, for example, non-conductive regions 720 may be formed by depositing an insulating layer such as, for example, a silicon dioxide ($SiO_2$) layer.

As shown in FIG. 7B, there are two ring shaped conductive regions, namely the outer ring region 712 and the inner ring region 732, for example, provided just under the surface of the top side of the rotary wheel 230. The outer ring region 712 is electrically connected to each of the first conductive regions 710 on the bottom side of the rotary wheel, as shown in FIG. 7A. Similarly, the inner ring region 732, provided on the inner periphery of the top side of the rotary wheel 230, is electrically connected to the second conductive inner ring region 730 on the bottom side of the rotary wheel, also shown in FIG. 7A. Additionally, in the depicted example of FIG. 7B, while the positions of the three sets of pads 221 to which the three switches are to be connected are shown, the switches that are to respectively connect to them are not shown. Thus, when the switches are closed, by a user pushing down on the cover cap 215 (shown in FIGS. 2 and 3) until the switches make a clicking sound or equivalent, the inner portion of each pad is electrically connected to the outer portion of each pad, which causes regions 712 and 732 to be electrically connected. This also causes, with reference to FIG. 7A, all of the respective first conductive regions 710 to be connected to the inner ring second conductive region 732. It is noted that there may be more or less switches, and corresponding sets of switch pads to which they connect, in alternate embodiments. In some instances, the switch pads 221 may be placed equidistantly around the rotary wheel 230. In some variations, the switches may have more than two states, and thus have more positions than "compressed" or closed, and "uncompressed" or open."

Figure 8:
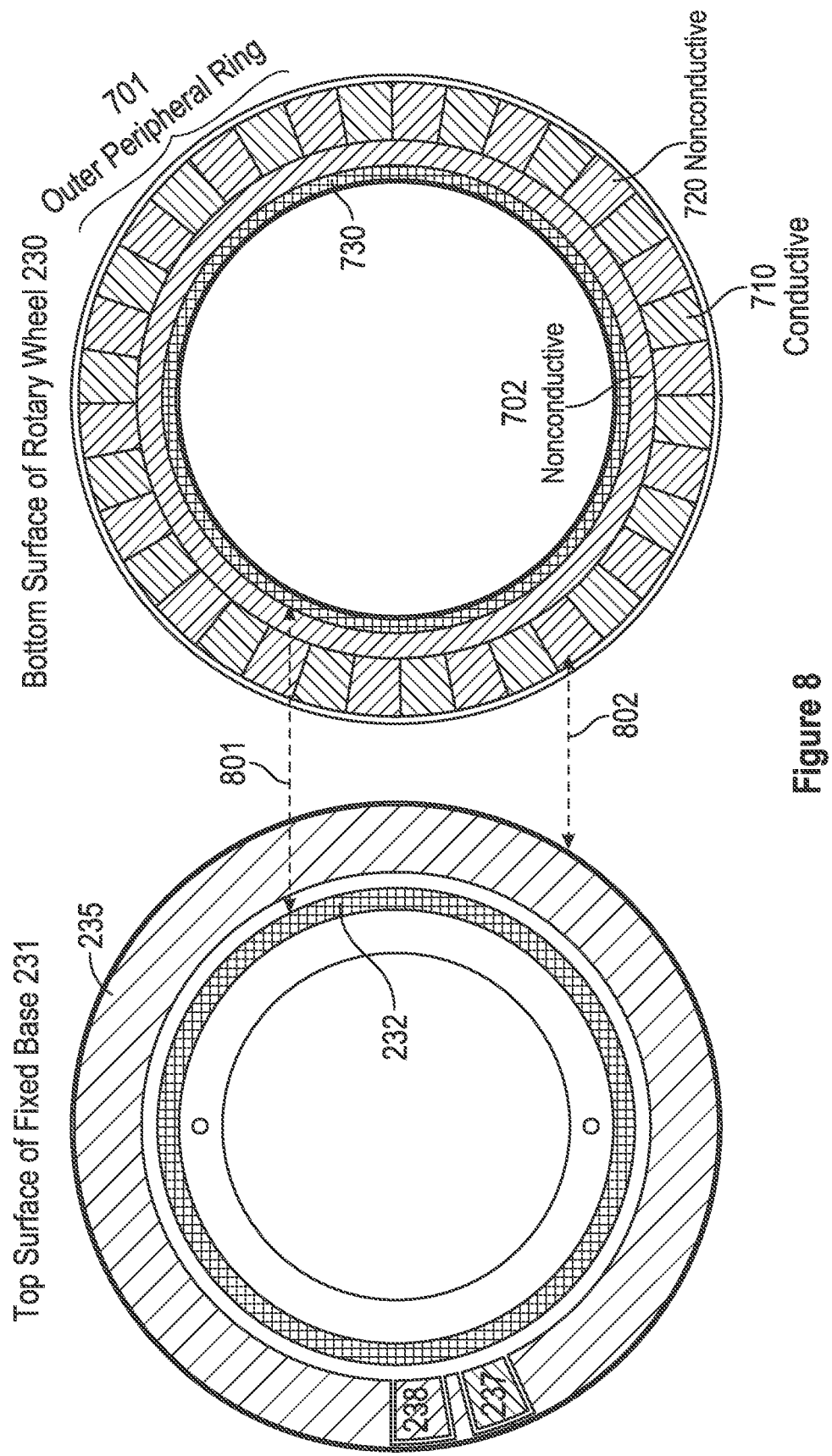
FIG. 8 depicts the top view of the example fixed base and the bottom view of the example rotary wheel, as shown in FIGS. 5 and 7A, respectively, and capacitive coupling between them according to one or more examples of the present disclosure.

Regarding the top and bottom surfaces of the fixed base 231 and the rotary wheel 230, FIG. 8 illustrates the electrical coupling between the top surface of the fixed base 231 and the bottom surface of rotary wheel 230, which, in one or more embodiments, face each other in the assembled rotary knob interface, when the rotary wheel 230 sits above the fixed base 231. With reference thereto, dashed arrow 801 depicts the electrical coupling between inner ring 232 of the top surface of the example fixed base 231, and the inner ring 730 of the bottom surface of the example rotary wheel 230. Additionally, dashed arrow 802 depicts the electrical coupling between peripheral ring 235 of the top surface of the example fixed base 231, which includes conductive pads 237 and 238, and the various conductive regions 710 of the outer peripheral ring 701 of the bottom surface of the example rotary wheel 230. As noted above, the regions 720 of the outer peripheral ring 701, of the bottom surface of the rotary wheel 230, are non-conductive, as shown, as is the non-conductive divider ring 702, which is provided between the outer peripheral ring 701 and the inner conductive ring 730. In some examples, the respective pairs of regions indicated by the dashed arrows 801 and 802 are capacitively coupled, given the non-conductive horizontal plastic bearing 226 that sits between the two surfaces, as described above with reference to FIG. 6A.

As shown in FIG. 8, when the rotary wheel 230 is positioned above the fixed base 231 (with the horizontal bearing between them), there may be various electrical couplings between their respective peripheral ring regions. While the peripheral ring 235, which is coupled to a reference signal of the input device via the set of electrodes 430, may be capacitively coupled to a number of conductive regions 710 of the rotary wheel underside, whether one or both of the conductive pads 237, 238 are coupled to conductive pads 710 of the rotary wheel underside depends upon the relative rotational position of the rotary wheel 230 and the fixed base 231.

In some examples, in order to sense rotation, the two conductive pads 237 and 238 on the top surface of fixed base 231 may be coupled to electrodes on the surface of the input device that are respectively driven with sensing signals. As noted above with reference to FIG. 4A, the conductive pads 237 and 238 on the top surface of fixed base 231 are respectively electrically connected with the sensing electrodes 410 and 411 provided on the bottom surface of the fixed base 231. In turn, the sensing electrodes 410 and 411 are coupled to corresponding input device electrodes that are driven with sensing signals, as shown, for example, in FIG. 4C. In some examples, by driving the input device electrodes that are respectively coupled to the fixed base sensing electrodes 410 and 411 with sensing signals, different resulting signals are received by those input device electrodes as a function of the capacitive coupling of each of the two conductive pads 237 and 238 on the top surface of fixed base 231 with the array of conductive 710 and non-conductive 720 regions on the bottom surface of the rotary wheel 230.

Figure 9:
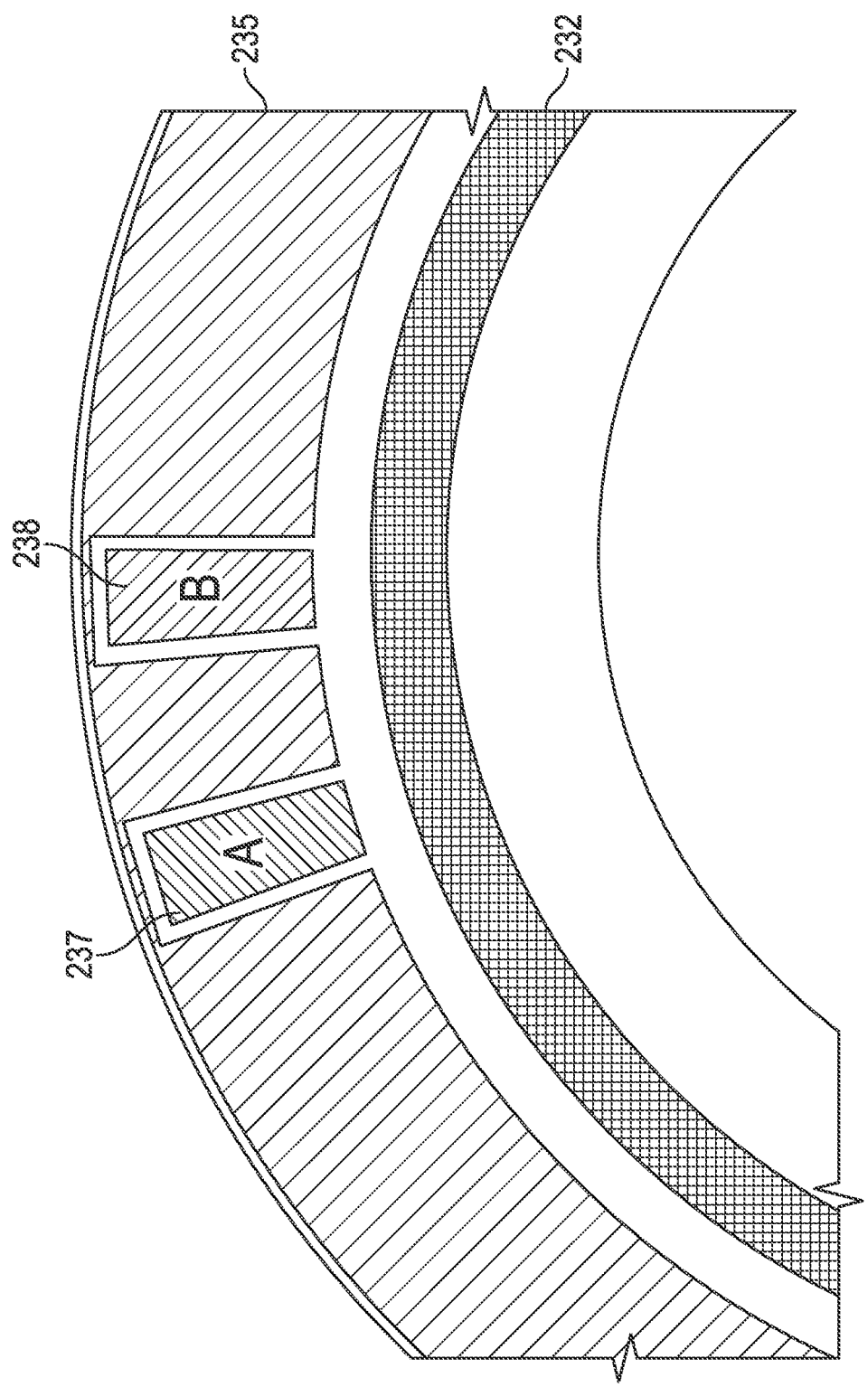
FIG. 9 illustrates example channel assignment of the outer region conductive pads of the top of the fixed base according to one or more examples of the present disclosure.

FIG. 9 is a small arcuate portion of the peripheral ring of the top surface of the fixed base. The portion shown corresponds to the portion of image shown in FIG. 7B that includes conductive pads 237 and 238. To distinguish the signals coupled to each conductive pad, with reference to FIG. 9, in some examples, the conductive pad 237 is assigned to channel A and conductive pad 238 is assigned to channel B. For convenience, for example, the conductive pad 237 may be referred to herein as the "channel A pad", and the conductive pad 238 may be referred to as the "channel B pad." By measuring resulting signals received by the electrodes (e.g., electrodes 410 and 411 as shown in FIGS. 4A, 4C, and 5) on the input device that are respectively coupled to each of conductive pads 237 and 238 at different points in time, the processing system 110 may determine the direction of the rotation. Also shown in FIG. 9 is the peripheral ring 235 (which is coupled to the set of electrodes 430 of the input device, and thus to the reference signal that drives them), and the inner ring conductive region 232 that is used to sense "click" of the switches closing.

Figure 10:
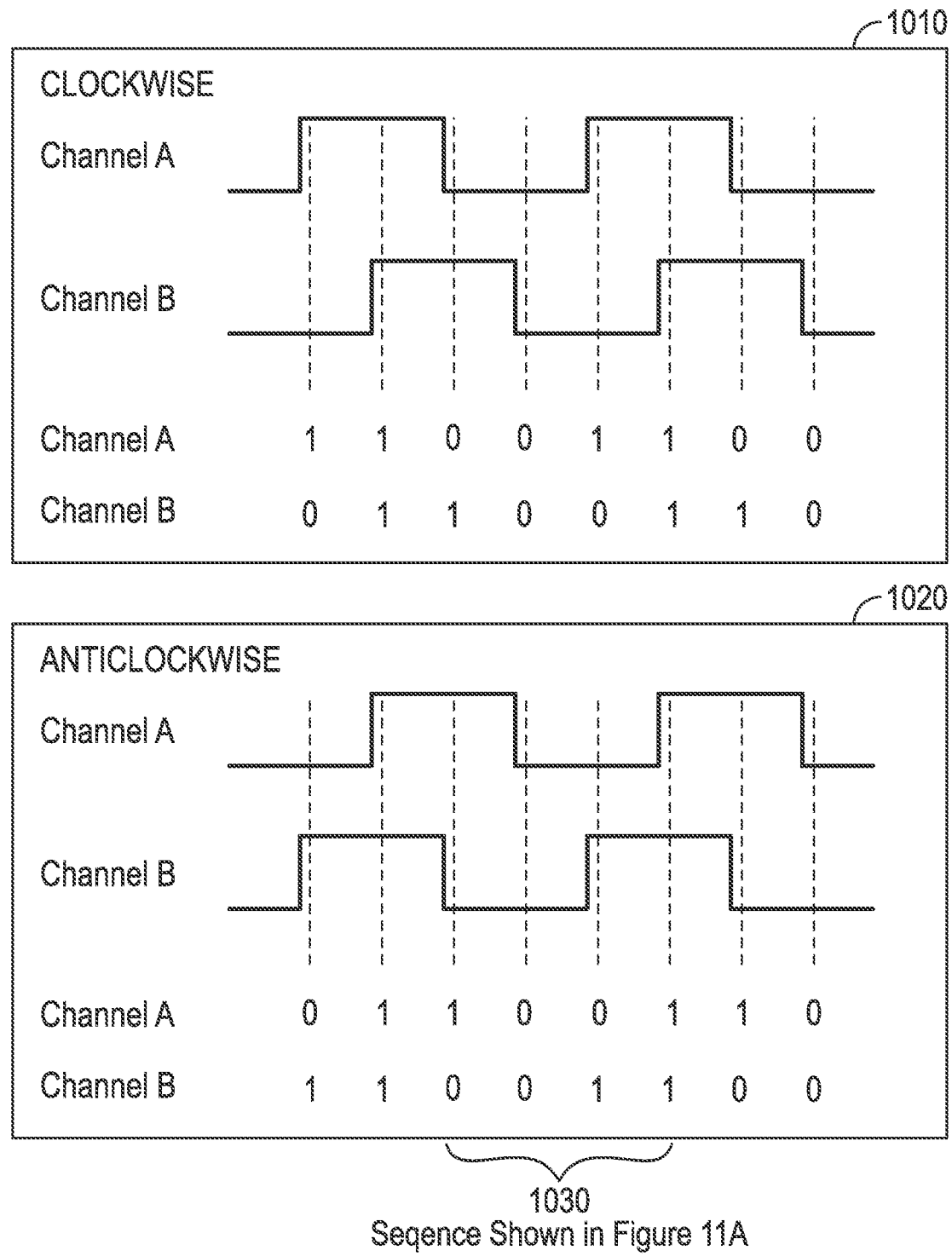
FIG. 10 illustrates example digitized quadrature encoder signals that may be generated by interaction of an example rotary wheel with an upper surface of the example fixed base of FIG. 9 according to one or more examples of the present disclosure.
Figure 11A:
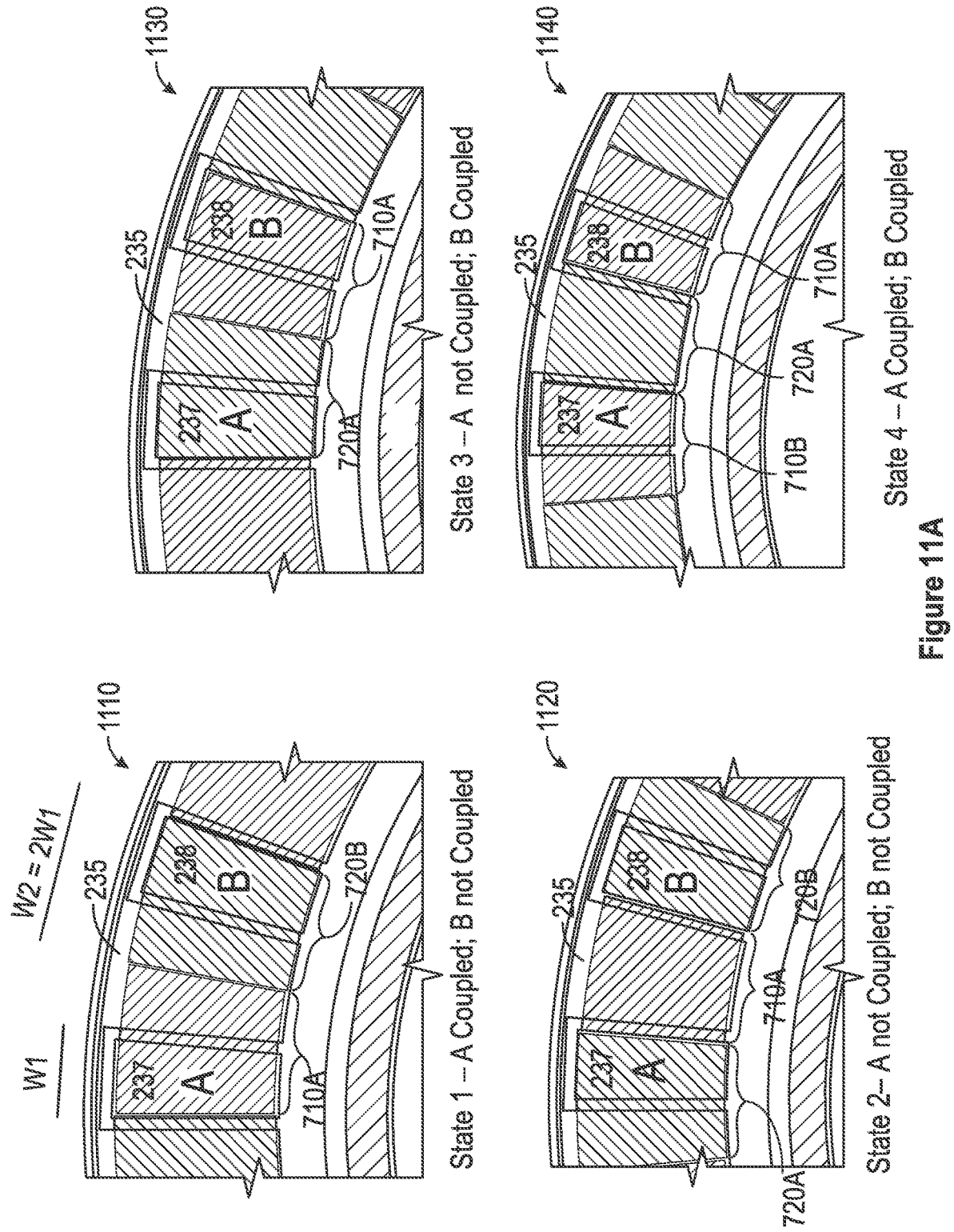
FIG. 11A illustrates four exemplary coupling states between the "A" and "B" designated conductive pads of the top of the fixed base of FIG. 9 and the bottom of the rotary wheel according to one or more examples of the present disclosure.

FIG. 10 illustrates example digitized quadrature encoder signals that may be generated by interaction of an example rotary wheel with an upper surface of the example fixed base of FIG. 9 according to one or more examples of the present disclosure. For instance, FIG. 10 illustrates examples of digitized quadrature encoder signals that may be generated by the interaction of the conductive pads 237 and 238 of the example fixed base having the example channel assignments shown in FIG. 9, with the alternating conductive 710 and non-conductive 720 regions of the outer peripheral ring on the bottom surface of rotary wheel 230, as rotary wheel 230 is rotated by the user. The generated signals have one sequence for clockwise rotation 1010, and another sequence for anticlockwise rotation 1020. The relative rotation may be determined in firmware by comparing successive sequences or states. As shown, the respective signals used for channels A and B are identical, but are shifted 90 degrees in phase. These signals may be better understood with reference to all of the possible overlap states between conductive pads 237 and 238 of fixed base 231 with the underside pattern of rotary wheel 230, as is illustrated in FIG. 11A. For instance, the four data points 1030 of the anticlockwise rotation sequence 1020 are shown in and described in FIG. 11A.

FIG. 11A illustrates four exemplary coupling states between the "A" and "B" designated conductive pads of the top of the fixed base of FIG. 9 and the bottom of the rotary wheel according to one or more examples of the present disclosure. For instance, FIG. 11A illustrates four possible coupling states, 1110 through 1140, of the "A" and "B" designated conductive pads 237 and 238 on the top of the fixed base 231 of FIG. 9, with the pattern of alternating conductive 710 and non-conductive 720 regions of the outer peripheral ring on the bottom of the rotary wheel 230. In FIG. 11A, only a small portion of the peripheral ring 235 of the fixed base, near where the conductive pads 237 and 238 are provided, is shown. The relative positions of the conductive pads 237 and 238 to the underside of the rotary wheel 230 generate the illustrated signals. FIG. 11A also shows a small portion of the peripheral ring 235 of the top of fixed base 231, as shown in FIG. 9 and described above, which surrounds conductive pads 237 and 238. Each of the four states depicted in FIG. 11A has a corresponding data point (e.g., state) in the encoder signals of FIG. 10. For instance, in FIG. 11A, the view is from under the top surface of the fixed base 231, looking upwards, with conductive pads 237 and 238, and peripheral ring 235 shown transparently, so that the alternating conductive 710 and nonconductive 720 peripheral regions on the bottom of the rotary wheel 230 are seen in the background. To distinguish conductive and non-conductive regions 710 and 720, conductive region 710 is shaded using diagonal lines that run from top left to bottom right ("backslash"), and non-conductive region 720 is shaded with diagonal lines that run from bottom left to top right ("frontslash"), as shown.

In the depicted example of FIG. 11A, the alternating conductive 710 and non-conductive 720 regions have the same shape and size. It is also noted that in the depicted example of FIG. 11A, the conductive pads 237 and 238, carrying channels A and B, respectively, on the upper surface of fixed base 231 are sized such that their pad width, W1 is one-half the width W2 of a conductive 710 or non-conductive 720 region of the bottom of the rotary wheel, such that two of conductive pads 237 or 238 could fit within, or underneath, one conductive 710 or non-conductive 720 region. Further, the conductive pads 237 and 238 are separated from each other by two conductive pad widths W1, or one region (710, 720) width W2. The four states, as shown, indicate an anticlockwise rotation of the rotary wheel 230 relative to the fixed base 231. Accordingly, because, as noted, the view is from underneath the upper surface of the fixed base 231 looking into the bottom of the rotary wheel 230, it appears that the conductive pads 237 and 238, carrying channels A and B respectively, while in reality stationary, are moving anti-clockwise relative to the bottom of the rotary wheel 230.

Beginning with State 1 1110, the channel A pad 237 of the upper surface of the fixed base 231 is coupled to a conductive region 710A of the bottom surface of the rotary wheel 230, but the channel B pad 238 is not, being underneath a non-conductive region 720B of the bottom surface of the rotary wheel 230, as shown. Thus, in terms of the encoder signals of FIG. 10, which follow the convention that "coupled to a conductive region 710"=1, and "coupled to a non-conductive region 720"=0, channel A has a 1 and channel B a 0, or an overall (A,B) value of (1,0). At State 2 1120, which indicates a one pad width W1 turn (which is a one half of a conductive or non-conductive region width W2 turn) of the rotary wheel 230 to the right, moving A pad 237 over to the left under a next non-conductive pad 720A, and moving B pad 238 to be under the left side of non-conductive pad 720B, now neither the A pad nor the B pad is coupled to a conductive region 710, and thus both channels A and B have a value of 0, or an overall (A,B) value of (0,0). The change from (A,B)=(1,0) to (0,0) is shown in FIG. 10 in the example anticlockwise signal set 1020 as the third and fourth data points in the sequence. At State 3 1130, A pad 237 has now moved by a single W1 turn to the left to be under the left side of non-conductive region 720A, and thus the A pad is still not coupled, but the B pad has moved one W1 turn to be underneath the right side of conductive region 710A, and now is coupled. Thus, channel A has a 0 value and channel B a 1 value, for an overall (0,1) value. Finally, at State 4 1140, the pads A and B have moved another single W1 turn to the left, corresponding to the rotary wheel above having turned another W1 turn to the right. Now both the A channel pad 237 and the B channel pad 238 are coupled to conductive regions of the rotary wheel underside. Pad A 237 has moved to the right side of conductive region 710B, and pad B 238 has moved to the left side of conductive region 710A, and thus both channels A and B have values of 1, for an overall (A,B)=(1,1).

Thus, the progression of data points (A,B) through the four states of FIG. 11A is from (1,0) to (0,0) to (0,1) to (1,1). As shown at 1030 of FIG. 10, this sequence indicates an anticlockwise rotation. As noted above, it is here assumed that when a conductive pad 237 or 238 of the fixed base 231 is aligned with a conductive region 710 of the rotary wheel 230's underside, its signal value=1, and when the conductive pad 237 or 238 is aligned with a non-conductive region 720 of the underside of rotary wheel 230, its signal value=0. In alternate examples, the inverse convention may be used.

In some examples, there is a relationship between the widths of conductive pads 237 and 238 (which have the same width, W1), and the widths of a conductive 710 or non-conductive 720 region (which have the same width, W2). In some instances, it is the relative widths of W1 and W2 that determine the resolution with which rotations of the rotary wheel 230 relative to the fixed base 231 may be detected. In one such instance, as shown in FIG. 11A, the width W1 of each of conductive pads 237 and 238 is one half the width W2 of an underside conductive or non-conductive region 710 or 720. Thus, in such instances, a change in rotation as a conductive pad 237 or 238 moves a W1 step may be detected. This is because in a W1 sized step a conductive pad 237 or 238 either moves from being under one side of a region 710 or 720 to the other side of that region, as is shown in FIG. 11A for conductive pad 238 moving from one side of non-conductive region 720B to the other side of that region, between State 1 and State 2, or in a W1 sized step it moves from a second side of a region 710 or 720, to a first side of an adjacent region of the other type, as shown, for example, in FIG. 11A for conductive pad 237 moving from the second side of conductive region 710A to the first side of non-conductive region 720A.

Figure 11B:
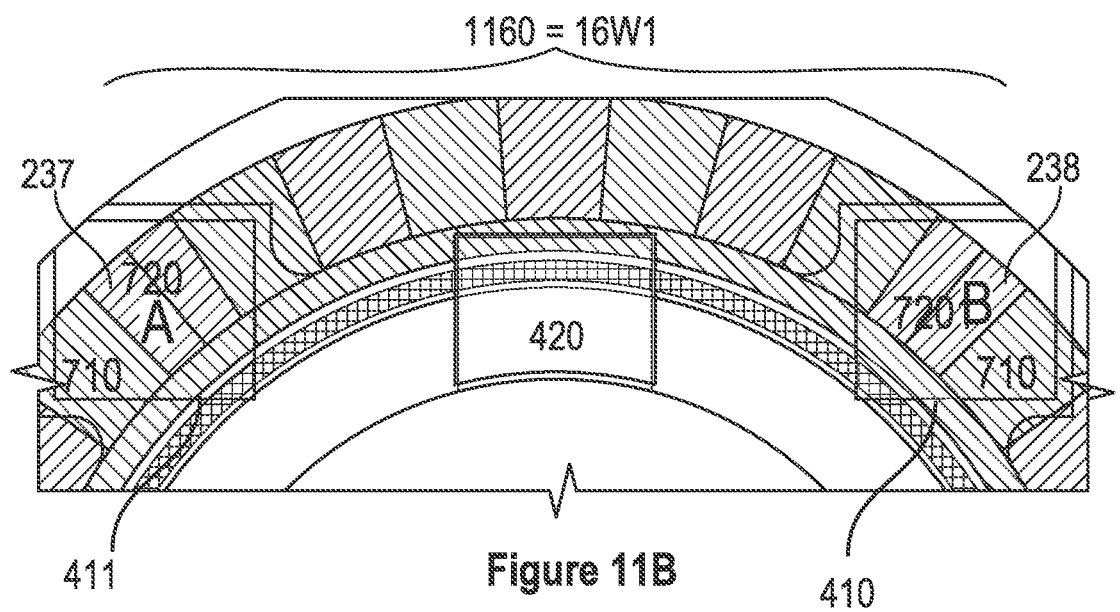
FIG. 11B illustrates an example distance between the two outer region conductive pads of the top of the fixed base of FIG. 9 according to one or more examples of the present disclosure.

FIG. 11B illustrates an example distance 1160 between conductive pads A 237 and B 238 of fixed base 231 in terms of the W1 conductive pad width. The point of view here in FIG. 11B is now from underneath the entire fixed base 231, looking upwards into essentially FIGS. 4C and 5, where the three sensing electrodes 411, 410 and 420 of the bottom surface of the fixed base, and the two conductive pads A 237 and B 238 on the top surface of the fixed base, are all shown in transparent mode. As shown, there are sixteen conductive pad width W1 divisions between conductive pads A 237 and B 238. There are seven conductive/non-conductive regions 710, 720 between them, of width W2 each, as well as two additional W1 width regions, one to the right of A pad 237 and the other to the left of B pad 238. Conductive pads 237 and 238 are positioned above their corresponding coupling electrodes 411 and 410, respectively, on the underside of the fixed base. The distancing of pads 237 and 238 by a distance equal to 16W1 is so as to reduce parasitic coupling from other neighboring sensing pixels. Thus, in some examples, because coupling electrodes 411 and 410 have a specific location in alignment to the grid, as shown in FIG. 4C and described above, the conductive pads 237 and 238 are restricted to certain areas. In the example configuration of FIG. 11B, neither of the two conductive pads 237 and 238 are coupled to a conductive region of the underside of the rotary wheel. As shown, both are coupled to non-conductive regions 720. However, one turn to the right would move conductive pad 238, carrying the B channel, to couple to an adjacent conductive region, or, alternatively, one turn to the left would move conductive pad 237, carrying the A channel, to couple to an adjacent conductive region 710.

Figure 12:
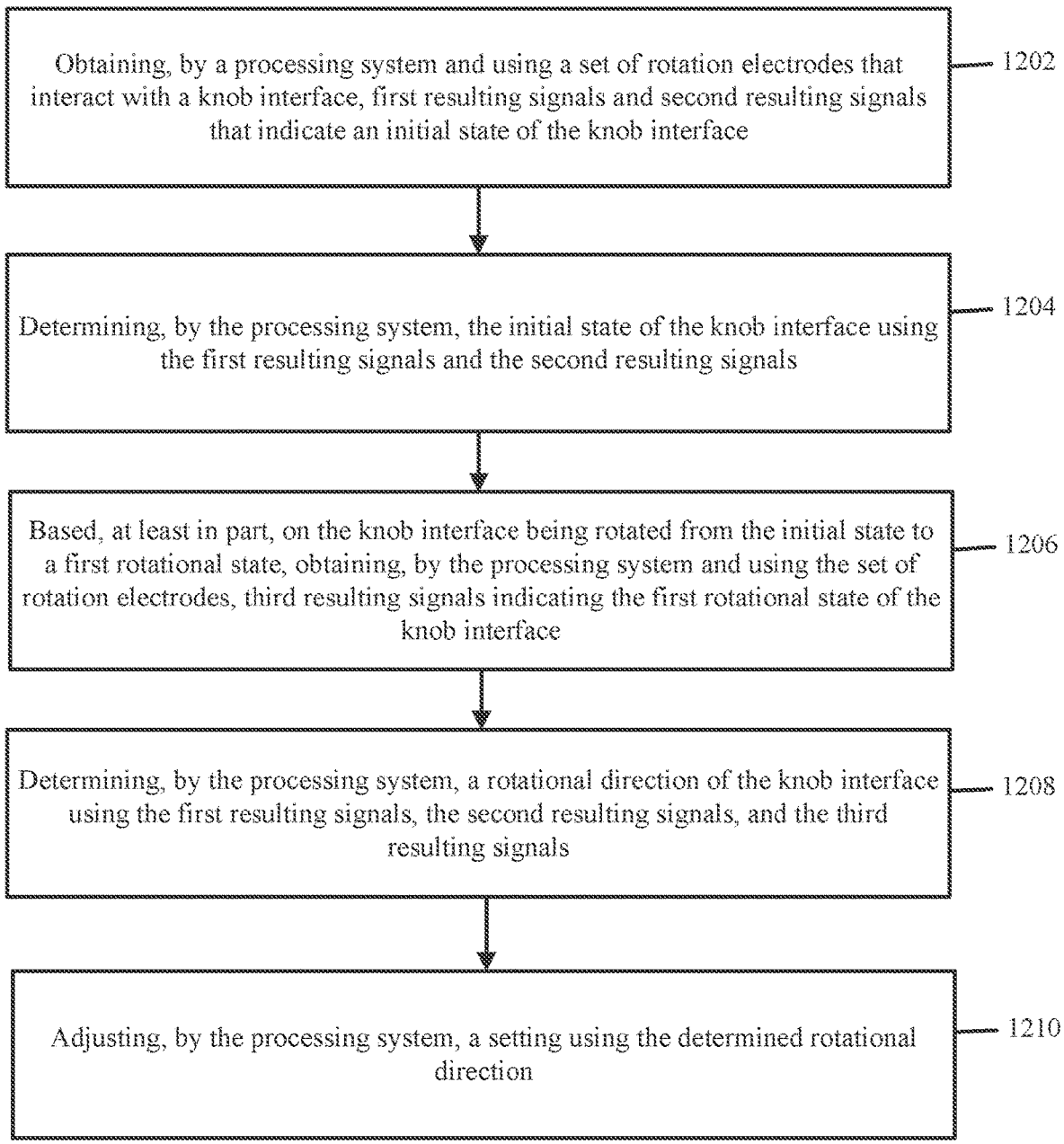
FIG. 12 is a flowchart of an exemplary process for determining a direction of rotation of the rotatable knob interface according to one or more examples of the present disclosure.

FIG. 12 is a flowchart of an exemplary process for determining a direction of rotation of the rotatable knob interface according to one or more examples of the present disclosure. The process 1200 may be performed by the electronic device 100 and in particular, the processing system 110 shown in FIG. 1. However, it will be recognized that an input device that includes additional and/or fewer components as shown in FIG. 1 may be used to perform process 1200, that any of the following blocks may be performed in any suitable order, and that the process 1200 may be performed in any suitable environment. The descriptions, illustrations, and processes of FIG. 12 are merely exemplary and the process 1200 may use other descriptions, illustrations, and processes for determining a direction of rotation of a rotatable knob interface 150.

For instance, as mentioned above, in traditional systems, the processing system is unable to determine the correct initial state of the knob interface 150 (e.g., a state prior to rotation of the knob interface 150). As such, traditional systems may use two separate states of rotation of the knob interface 150 to determine whether the user has rotated the knob interface in a clockwise or counterclockwise direction. However, in some instances, the user may seek to adjust a setting (e.g., fan speed or volume) by only a single rotational state. As such, a processing system may obtain resulting signals indicating only one state of the pads 237 and 238 (e.g., the state of (1,1)). In such instances, traditional processing systems may be unable to determine the direction of rotation of the knob interface 150 and may thus fail to adjust the setting accordingly. For instance, the user may seek to lower the volume by 1 value (e.g., from a setting of "15" to a setting of "14"). The traditional processing system may detect the rotational state of (1,1) as the user adjusts the volume setting from "15" to "14", but because the user adjusted the volume by one setting, the processing system 110 may only detect this state of (1,1) and might not detect a second rotational state (e.g., a second state indicating (0,1) or (1,0)). Without this second rotational state and using only the one detected rotational state of (1,1), the traditional processing system might not be able to determine the direction of rotation for the knob interface 150 (e.g., whether to increase or lower the volume by 1).

Accordingly, as will be described below, aspects of the present disclosure provide a process 1200 for the processing system 110 to determine an initial state of the knob interface 150. For instance, the processing system 110 may determine the initial state upon start-up (e.g., the electronic device 100 may be associated with a vehicle, and the processing system 110 may determine the initial state upon and/or during start-up of the vehicle). Using the initial state of the knob interface 150 (e.g., if the initial state is (1,0) or (0,1)) and the detected first rotational state (1,1), the processing system 110 determines the direction of rotation of the knob interface 150 even if the user rotates the knob interface 150 by a single rotational state. For instance, as shown in FIG. 10, if the initial state is (1,0) and the detected state after the user rotates the knob interface 150 is (1,1), then the processing system 110 determines the direction of rotation of the knob interface 150 is clockwise. Similarly, if the initial state is (0,1), then the processing system 110 determines the direction of rotation is anticlockwise.

In operation, at block 1202, the processing system 110 obtains, using a set of rotation electrodes (e.g., the second set of electrodes 410 and 411 shown in FIGS. 4A, 4C, and 5) that interact with a knob interface 150, first resulting signals and second resulting signals indicating an initial state of the knob interface 150. The initial state of the knob interface 150 may be a state prior to rotation of the knob interface 150 by a user (e.g., when the knob interface is stationary), and may be a state of (0,0), (1,0), (1,1), or (0,1). For instance, the initial state of the knob interface 150 may be a state of the knob interface during start-up (e.g., initialization, turning on, energizing, igniting, and so on) of the electronic device 100 and/or the electronic system that includes and/or is coupled to the electronic device 100. For example, the electronic device 100 and/or the electronic system may perform a plurality of operations or functions (e.g., start-up functions) in order to properly start the electronic device 100 and/or system. Blocks 1202 and 1204 of process 1200 may be part of the start-up functions that the electronic device 100 performs. For instance, during the start-up process, the processing system 110 may perform blocks 1202 and 1204 to determine the initial state of the knob interface 150 (e.g., the initial state of the conductive pads 237 and 238). In some instances, the electronic system may be a vehicle with a GUI that includes the knob interface 150. During the start-up process of the vehicle, the processing system 110 may obtain first resulting signals and/or second resulting signals from the rotation electrodes.

As mentioned above, the rotation electrodes may be the second set of electrodes 410 and 411 shown in FIGS. 4A, 4C, and 5. The rotation electrodes may be electrically connected to the conductive pads 237 and 238, which are coupled to the outer peripheral ring with the conductive regions 710 and the nonconductive regions 720. The processing system 110 may provide one or more signals (e.g., the sensing signals and/or the reference signals/ground signals) to the first, second, and/or third sets of electrodes (e.g., electrodes 410, 411, 420, and/or 430 of FIGS. 4A-4C and 5). The processing system 110 may obtain resulting signals from the second set of electrodes (e.g., the rotation electrodes) in response to providing the one or more signals.

At block 1204, the processing system 110 determines the initial state of the knob interface using the first resulting signals and the second resulting signals. For example, referring to FIG. 11A, in view of the coupling between the conductive pads 237, 238 and the peripheral ring with the alternating conductive and nonconductive regions 710, 720, the processing system 110 determines the initial state of the knob (e.g., a state of (0,0), (0,1), (1,0), or (1,1)). However, prior to rotation of the knob interface 150, the processing system 110 may have difficulty determining the initial state using only a single set of resulting signals. For instance, the processing system 110 may determine the state of the knob interface 150 by determining a difference (e.g., calculating a delta) between a first value (e.g., the first resulting signals such as baseline analog to digital (ADC) values) and a second value (e.g., the second resulting signals such as current raw ADC values). Traditionally, during start-up and/or prior to rotation of the knob interface 150, the processing system 110 may be unable to determine baseline ADC values (e.g., the first resulting signals) and without the baseline ADC values, may be unable to determine the initial state of the knob interface 150. For instance, in traditional systems, the processing system may always use the state (0,0) as the baseline ADC values regardless of whether the state of the conductive pads 237, 238 are at the state (0,0) or at another state (e.g., (1,0), (1,1) or (0,1). As such, as will be explained in detail below in FIGS. 13 and 14, the processing system 110 may determine the first resulting signals and the second resulting signals, and use a comparison of these resulting signals to determine the initial state of the knob interface 150.

At block 1206, based, at least in part, on the knob interface being rotated from the initial state to a first rotational state, the processing system 110 obtains, using the set of rotation electrodes, third resulting signals indicating first rotational state of the knob interface 150. The first rotational state of the knob interface may be the first state of the conductive pads 237, 238 after the user rotates the knob interface 150. For example, after the user rotates the knob interface 150 by one state (e.g., a single resolution, detent, and so on), the processing system 110 obtains third resulting signals indicating the states (e.g., the first rotational state) of the conductive pads 237, 238. For instance, the user may rotate the knob interface 150 to change a setting (e.g., volume, temperature, fan). The processing system 110 may provide one or more signals to the electrodes that interact with the knob interface 150. For instance, as described above, the processing system 110 may provide reference signals to the first set of electrodes (e.g., reference signal electrodes). The reference signals may be a ground signal signals (e.g., a configurable DC output provided by the processing system 110). Further, the processing system 110 may provide sensing signals to the first and/or the second set of electrodes such as the rotation electrodes 410, 411. Depending on the connection between the conductive pads 237, 238 and the regions of the peripheral ring 701 (e.g., the conductive and nonconductive regions 710, 720), the processing system 110 may obtain different resulting signals. For instance, referring back to FIG. 11A and state 1, because the conductive pad 237 (e.g., channel A) is coupled to a conductive region 710A of the peripheral ring 701, the processing system 110 obtains a state for channel A of "1". Because the conductive pad 238 (e.g., channel B) is coupled to a non-conductive region 720B, the processing system 110 obtains a state for channel B of "0". As such, the processing system 110 determines the state (e.g., the first rotational state) as (1,0). Similarly, for state 3, if the conductive pad 237 is coupled to the conductive region 720A and the conductive pad 238 is coupled to the conductive region 710A, the processing system 110 determines the state as (0,1).

In some instances, the processing system 110 may provide the reference signals (e.g., a ground signal) and the sensing signals (e.g., a sine wave from a guard amplifier (AMP)) at the same time or at substantially the same time. In some examples, the processing system 110 may provide the signals (e.g., both the reference and sensing signals) at particular time intervals. For instance, the processing system 110 may provide the signals every 8.33 milliseconds (ms), which may be half of the display frame. The processing system 110 may provide the signals regardless of whether there is user input.

At block 1208, the processing system 110 determines a rotational direction of the knob interface using the first resulting signals, the second resulting signals, and the third resulting signals. For instance, the processing system 110 may determine the first rotational state using the third resulting signals (e.g., a state of (1,1)). The processing system 110 may further determine an initial state of the knob interface 150 using the first resulting signals and the second resulting signals (e.g., a state of (1,0)). Then, referring to FIG. 10, using these determined states, the processing system 110 determines a rotational direction of the knob interface 150. For instance, because the transition from the initial state to the first rotational state of the knob interface is from (1,0) to (1,1), the processing system 110 determines the rotational directional of the knob interface as a clockwise rotation. Likewise, if the initial state is (0,1) and because the transition from the initial state to the first rotational state of the knob interface is from (0,1) to (1,1), the processing system 110 determines the rotational directional of the knob interface as an anticlockwise rotation.

At block 1210, the processing system 110 adjusts a setting using the determined rotational direction. For instance, the electronic system and/or the electronic device 100 may include and/or control a plurality of settings. For example, the electronic system may be part of a vehicle and the electronic device 100 may control a plurality of settings for the vehicle including, but not limited to, fan, temperature, volume, and so on. Using the determined rotational direction, the processing system 110 may determine whether to increase or decrease the setting. Furthermore, in some instances, the user may seek to adjust a setting by a single state (e.g., a single resolution, detent, and so on). As such, using process 1200, the processing system 110 may determine the rotational direction even though the user has adjusted the setting by a single state by using the initial state prior to rotation of the knob interface 150. The processing system 110 may then adjust the setting using the determined rotational direction.

Figure 13:
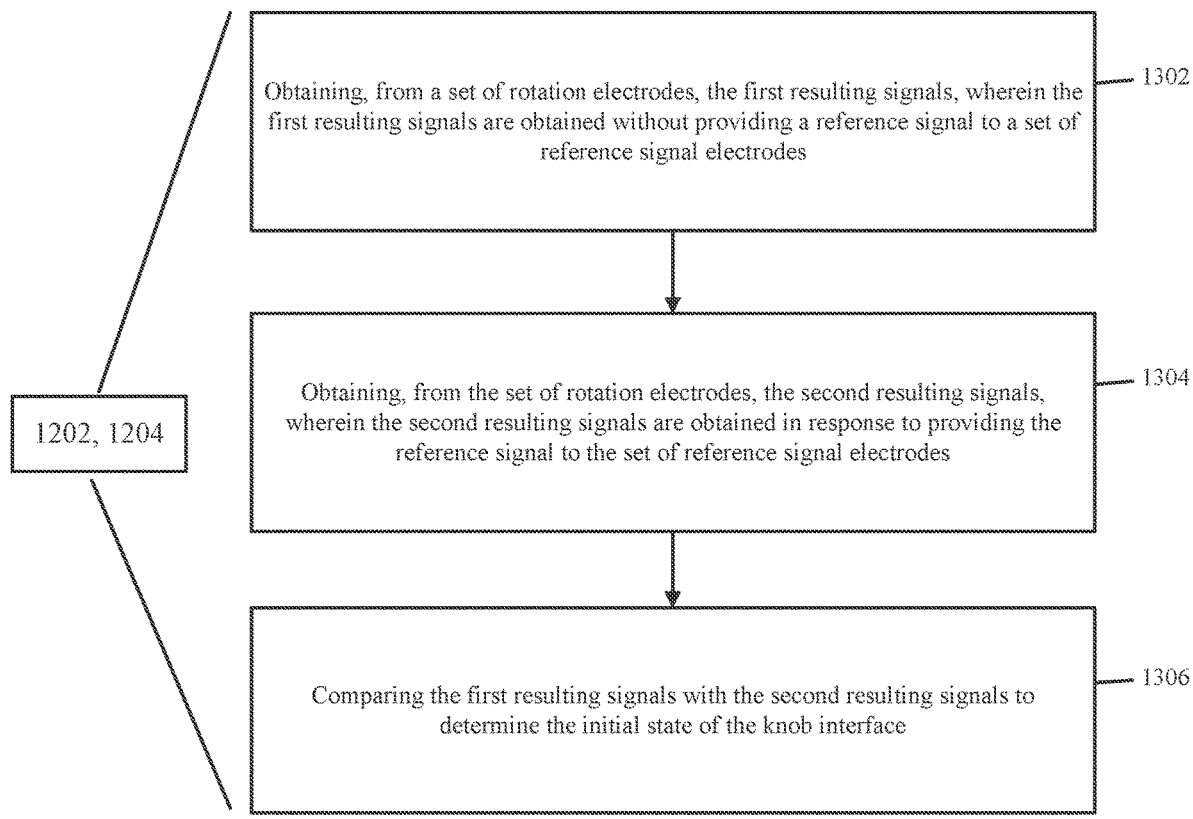
FIG. 13 is another flowchart of an exemplary process for determining a direction of rotation of the rotatable knob interface according to one or more examples of the present application.
Figure 14:
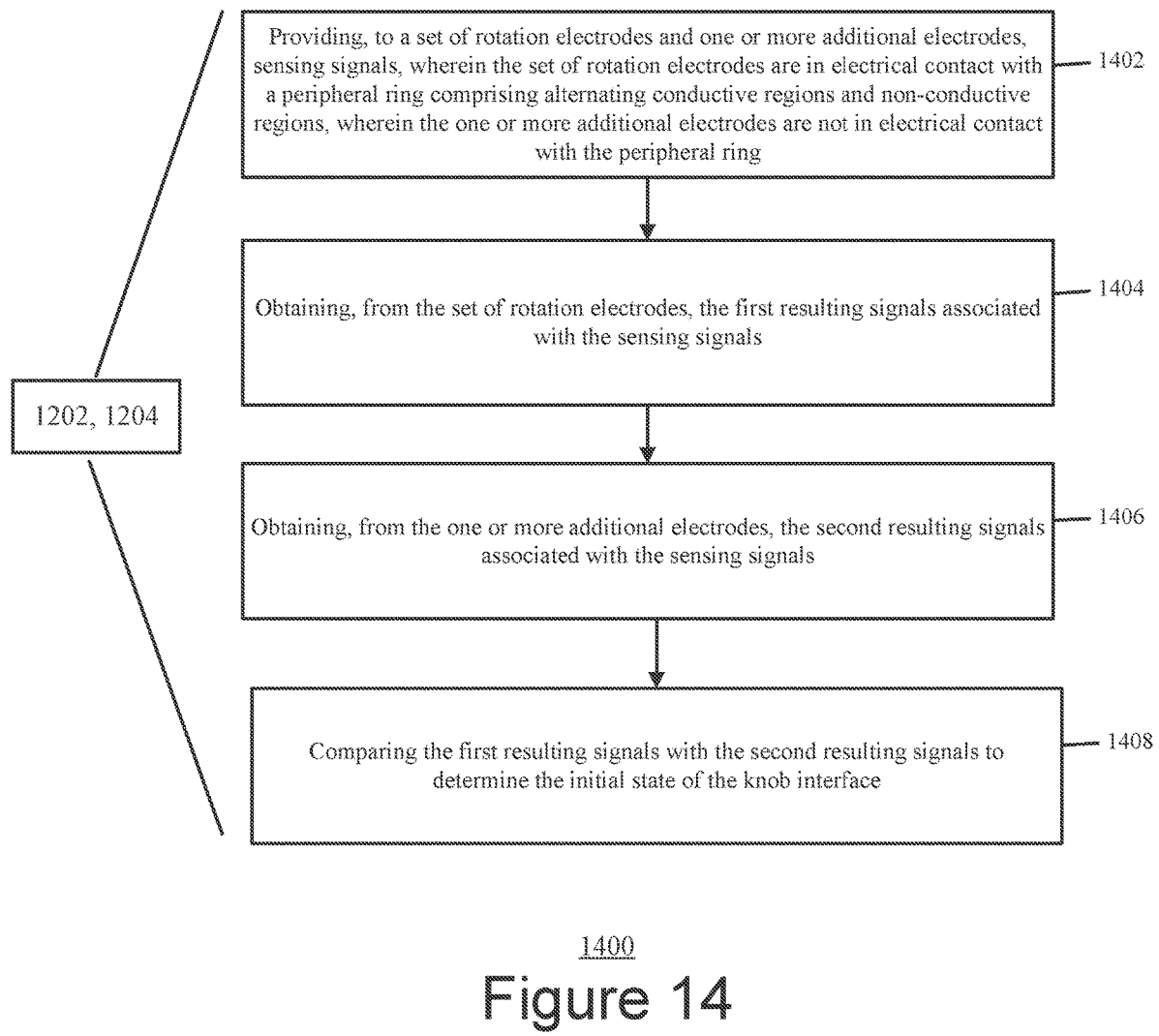
FIG. 14 is yet another flowchart of an exemplary process for determining a direction of rotation of the rotatable knob interface according to one or more examples of the present application.

FIGS. 13 and 14 will describe the processing system 110 determining the initial state of the knob interface 150 (e.g., blocks 1202 and 1204) in more detail. For example, FIG. 13 is another flowchart of an exemplary process for determining a direction of rotation of the rotatable knob interface according to one or more examples of the present application. The process 1300 may be performed by the electronic device 100 and in particular, the processing system 110 shown in FIG. 1. However, it will be recognized that any of the following blocks may be performed in any suitable order, and that the process 1300 may be performed in any suitable environment. The descriptions, illustrations, and processes of FIG. 13 are merely exemplary and the process 1300 may use other descriptions, illustrations, and processes for determining the direction of rotation of the rotatable knob interface 150.

At block 1302, the processing system 110 obtains, from a set of rotation electrodes (e.g., the second set of electrodes 410 and 411), the first resulting signals. The first resulting signals are obtained without providing a reference signal (e.g., a ground signal) to a set of reference signal electrodes (e.g., the first set of electrodes 430). For instance, prior to rotation of the rotatable knob interface 150 (e.g., during start-up), the processing system 110 may obtain first resulting signals. For example, as mentioned above at block 1206, when obtaining the third resulting signals, the processing system 110 provides a reference or grounding signal to the set of reference signal electrodes (e.g., the first set of electrodes 430). Here, at block 1302, the processing system 110 does not provide a reference signal to the set of reference signal electrodes. Instead, the processing system 110 provides sensing signals to the rotation electrodes (e.g., the electrodes 410 and 411) and obtains resulting signals (e.g., the first resulting signals) associated with the sensing signals. For example, because no reference signals were sent to the reference signal electrodes, the first resulting signals may be similar to the case where the conductive pads 237, 238 are in contact with the non-conductive regions 720 of the peripheral ring 701 (e.g., a state of 0,0) regardless if the conductive pads 237, 238 are coupled with the conductive regions 710 or the non-conductive regions 720. In some instances, the processing system 110 may generate a raw image (e.g., an image indicating the resulting signals from the grid of electrodes 401 including the rotation electrodes 410 and 411).

At block 1304, the processing system 110 obtains, from the set of rotation electrodes, the second resulting signals. The second resulting signals are obtained in response to providing the reference signal to the set of reference signal electrodes. For instance, after performing block 1302 (e.g., obtaining the first resulting signals without providing the reference signal to the set of reference signal electrodes), the processing system 110 provides the reference signal to the set of reference signal electrodes. Further, the processing system 110 provides the sensing signal to the rotation electrodes and obtains the second resulting signals associated with the sensing signal. In some instances, the processing system 110 may generate a raw image (e.g., an image indicating the resulting signals from the grid of electrodes 401 including the rotation electrodes 410 and 411).

At block 1306, the processing system 110 compares the first resulting signals with the second resulting signals to determine the initial state of the knob interface 150. For instance, if a conductive pad (e.g., conductive pad 237 or 238) is coupled to the non-conductive region 720 of the peripheral ring 701, the processing system 110 may determine that there is a little difference in the raw analog to digital conversion (ADC) values between the first and second resulting signals. If the conductive pad is coupled to the conductive region 710, the processing system 110 may determine that there is a significantly different raw ADC value between the first and second resulting signals. For example, the processing system 110 uses a comparison between the ADC baseline and the current raw ADC values to determine the states of the conductive pads 237, 238. As such, the processing system 110 uses the first resulting signals as the ADC baseline values and the second resulting signals as the current raw ADC values. Using these resulting signals, the processing system 110 determines the initial state of the knob interface 150.

For example, for conductive pad 237 (e.g., channel A), the processing system 110 may compare the ADC values from the resulting signals from when the reference signal was not provided to the reference signal electrodes (e.g., the ADC value from the first resulting signals obtained at block 1302) with the resulting signals from when the reference signal was provided to the reference signal electrodes (e.g., the ADC value from the second resulting signals). If the ADC values are similar (e.g., if the difference between the ADC values from the first and second resulting signals do not exceed a threshold), the processing system 110 may determine that the conductive pad 237 is connected to a non-conductive region 720 of the peripheral ring 701 and determine the state of channel A as "0". If the ADC values are significantly different (e.g., the difference between the ADC values from the first and second resulting signals exceed a threshold), the processing system 110 may determine that the conductive pad 237 is connected to a conductive region 710 and determine the state of channel B as "1". The processing system 110 may perform the above for the conductive pad 238 as well.

Afterwards, the processing system 110 determines an initial state of the knob interface using the states of the conductive pads 237, 238. For instance, the initial state may be (0,0), (0,1), (1,0), or (1,1) as described above. Then, returning back to process 1200, the processing system 110 may use the initial state to determine the rotational direction of the knob interface 150. In some instances, the processing system 110 may store the first resulting signals, the second resulting signals, and/or the initial state in memory. For instance, the processing system 110 may store the raw images associated with the first and second resulting signals in memory prior to performing block 1306 and comparing the first and second resulting signals.

FIG. 14 is another flowchart of an exemplary process for determining a direction of rotation of the rotatable knob interface according to one or more examples of the present application. The process 1400 may be performed by the electronic device 100 and in particular, the processing system 110 shown in FIG. 1. However, it will be recognized that any of the following blocks may be performed in any suitable order, and that the process 1400 may be performed in any suitable environment. The descriptions, illustrations, and processes of FIG. 14 are merely exemplary and the process 1400 may use other descriptions, illustrations, and processes for determining the direction of rotation of the rotatable knob interface 150.

At block 1402, the processing system 110 provides, to a set of rotation electrodes (e.g., the second set of electrodes 410, 411) and one or more additional electrodes, sensing signals. The set of rotation electrodes are in electrical contact with a peripheral ring 701 (e.g., via the conductive pads 237, 238) comprising alternative conductive regions 710 and non-conductive regions 720. The one or more additional electrodes are not in electrical contact with the peripheral ring 701 (e.g., are not electrically connected to the conductive pads 237, 238). For example, the processing system 110 may provide a reference signal to the set of reference signal electrodes (e.g., the first set of electrodes 430). The processing system 110 may provide sensing signals to the rotation electrodes. Further, the processing system 110 may also provide sensing signals to the additional electrodes. The additional electrodes may be any electrodes that are under the knob interface 150 and not part of the first, second, nor third set of electrodes (e.g., the electrodes 410, 420, 411, and 430). For instance, referring back to FIG. 4A, there is an empty column of electrodes 412 (e.g., sensing pixels) to the right of the sensing electrodes 410, 411 and 420 that provides a gap between the sensing electrodes 410, 411 and 420, and the set of electrodes 430. The additional electrodes may be an electrode within the empty column of electrodes 412 shown in FIG. 4A. For instance, the additional electrodes may be the two electrodes immediately to the right of the sensing electrodes 410 and 411. The processing system 110 may provide sensing signals to these two electrodes that are immediately to the right of the sensing electrodes 410 and 411. While the sensing electrodes 410 and 411 are electrically connected to the conductive pads 237 and 238, which are thus coupled to the peripheral ring 701 with the conductive and non-conductive regions 710 and 720, the additional electrodes (e.g., the electrodes to the right of sensing electrodes 410 and 411) are not electrically coupled to the conductive pads 237 and 238 and thus are not coupled to the peripheral ring 701.

At block 1404, the processing system 110 obtains, from the set of rotation electrodes, the first resulting signals associated with the sensing signals. At block 1406, the processing system 110 obtains, from the one or more additional electrodes, the second resulting signals associated with the sensing signals. For instance, in response to providing the sensing signals, the processing system 110 obtains the first resulting signals from the rotation electrodes (e.g., electrodes 410 and 411) and obtains the second resulting signals from the additional electrodes (e.g., the electrodes to the right of the rotation electrodes).

At block 1408, the processing system 110 compares the first resulting signals with the second resulting signals to determine the initial state of the knob interface 150. For instance, regarding the second resulting signals from the additional electrodes, as they are not connected to the peripheral ring 701, the resulting signals (e.g., the second resulting signals) may be similar to the case where the conductive pads 237, 238 are in contact with the non-conductive regions 720 of the peripheral ring 701. For instance, the additional electrodes may be under the peripheral ring 701, but because there are no conductive or sensing pads (e.g., conductive pads 237, 238) that electrically connect the additional electrodes to the peripheral ring 701, the processing system 110 may obtain second resulting signals indicating raw ADC values similar to if the conductive pads 237, 238 are in contact with the non-conductive regions 720.

The processing system 110 may compare the first resulting signals with the second resulting signals. For instance, the first resulting signals may indicate ADC values for the first and second channels (e.g., the channels A and B associated with the conductive pads 237 and 238). The second resulting signal may further indicate ADC values. The processing system 110 may compare the ADC value for the conductive pad 237 associated with channel A with the ADC value(s) obtained from the additional electrodes. If the conductive pad 237 is in contact with the non-conductive region 720 of the peripheral ring 701, the associated ADC value would be similar to the ADC value(s) from the additional electrodes. If the conductive pad 237 is in contact with the conductive region 710 of the peripheral ring 701, the associated ADC value would be different from the ADC value(s) from the additional electrodes. As such, by using a threshold, the processing system 110 may compare the ADC value of the electrode 410 associated with the conductive pad 237 with the ADC value(s) from the additional electrodes. If the ADC values are similar (e.g., if the difference between the ADC values from the rotational electrode and the additional electrode do not exceed a threshold), the processing system 110 may determine that the conductive pad 237 is connected to a non-conductive region 720 of the peripheral ring 701 and determine the state of channel A as "0". If the ADC values are significantly different (e.g., the difference between the ADC values from the rotational electrode and the additional electrode exceed a threshold), the processing system 110 may determine that the conductive pad 237 is connected to a conductive region 710 and determine the state of channel B as "1". The processing system 110 may perform the above for the conductive pad 238 as well.

Afterwards, the processing system 110 determines an initial state of the knob interface using the states of the conductive pads 237, 238. For instance, the initial state may be (0,0), (0,1), (1,0), or (1,1) as described above. Then, returning back to process 1200, the processing system 110 may use the initial state to determine the rotational direction of the knob interface 150.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those exemplary embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for determining a rotational direction of a knob interface, comprising:
   obtaining, by a processing system associated with an electric system and using a set of rotation electrodes that interact with the knob interface, first resulting signals, wherein the electric system is a control system of a vehicle;

obtaining, by the processing system, second resulting signals;

determining, by the processing system, an initial state of the knob interface during start-up operations for the vehicle using the first resulting signals and the second resulting signals;

obtaining, by the processing system and using the set of rotation electrodes, third resulting signals indicating a first rotational state of the knob interface, based at least in part on the knob interface being rotated from the initial state to the first rotational state;

determining, by the processing system, the rotational direction of the knob interface using the first resulting signals, the second resulting signals, and the third resulting signals; and adjusting, by the processing system, a setting using the determined rotational direction.

2. The method of claim 1, wherein the first resulting signals and the second resulting signals are obtained when the knob interface is stationary.

3. The method of claim 1, wherein the set of rotation electrodes comprise a first rotation electrode that is in electrical contact with a first conductive pad and a second rotation electrode that is in electrical contact with a second conductive pad, wherein the first conductive pad and the second conductive pad are in contact with a peripheral ring comprising alternating conductive regions and non-conductive regions, and wherein the initial state and the first rotational state indicate whether the first conductive pad and the second conductive pad are in contact with the conductive region or the non-conductive region of the peripheral ring.

4. The method of claim 1, wherein the first resulting signals indicate baseline analog to digital (ADC) values and the second resulting signals indicate current raw ADC values, and wherein determining the initial state of the knob interface is based on determining a difference between the baseline ADC values and the current raw ADC values.

5. The method of claim 1, wherein obtaining the first resulting signals and the second resulting signals is based on:
providing one or more sensing signals to the set of rotation electrodes.

6. The method of claim 5, wherein obtaining the first resulting signals and the second resulting signals is further based on:
providing one or more reference signals to a set of reference signal electrodes.

7. The method of claim 6, wherein obtaining the first resulting signals and the second resulting signals is further based on:
providing the one or more sensing signals to the set of reference signal electrodes.

8. The method of claim 6, wherein the one or more reference signals are ground signals, and wherein the one or more sensing signals are sine waves from a guard amplifier.

9. The method of claim 6, wherein the one or more reference signals and the one or more sensing signals are provided at substantially a same time interval.

10. The method of claim 6, wherein providing the one or more reference signals comprises providing the one or more reference signals at a first time interval, and wherein providing the one or more sensing signals comprises providing the one or more sensing signals at a second time interval that is subsequent to the first time interval.

11. A processing system for determining a rotational direction of a knob interface, comprising:
one or more processors; and
a non-transitory computer-readable medium having processor-executable instructions stored thereon, the processor-executable instructions, when executed by the one or more processors, facilitating performance of the following:
obtaining, using a set of rotation electrodes that interact with the knob interface, first resulting signals, wherein the processing system is associated with a control system of a vehicle;
obtaining second resulting signals;
determining an initial state of the knob interface during start-up operations for the vehicle using the first resulting signals and the second resulting signals;
obtaining, using the set of rotation electrodes, third resulting signals indicating a first rotational state of the knob interface, based at least in part on the knob interface being rotated from the initial state to the first rotational state;
determining the rotational direction of the knob interface using the first resulting signals, the second resulting signals, and the third resulting signals; and
adjusting a setting using the determined rotational direction.

12. The processing system of claim 11, wherein the first resulting signals and the second resulting signals are obtained when the knob interface is stationary.

13. The processing system of claim 11, wherein the set of rotation electrodes comprise a first rotation electrode that is in electrical contact with a first conductive pad and a second rotation electrode that is in electrical contact with a second conductive pad, wherein the first conductive pad and the second conductive pad are in contact with a peripheral ring comprising alternating conductive regions and non-conductive regions, and wherein the initial state and the first rotational state indicate whether the first conductive pad and the second conductive pad are in contact with the conductive region or the non-conductive region of the peripheral ring.

14. The processing system of claim 11, wherein obtaining the first resulting signals and the second resulting signals is based on:
providing one or more sensing signals to the set of rotation electrodes.

15. The processing system of claim 14, wherein obtaining the first resulting signals and the second resulting signals is further based on:
providing one or more reference signals to a set of reference signal electrodes.

16. The processing system of claim 15, wherein obtaining the first resulting signals and the second resulting signals is further based on:
providing the one or more sensing signals to the set of reference signal electrodes.

17. The processing system of claim 15, wherein the one or more reference signals are ground signals, and wherein the one or more sensing signals are sine waves from a guard amplifier.

18. The processing system of claim 15, wherein providing the one or more reference signals comprises providing the one or more reference signals at a first time interval, and wherein providing the one or more sensing signals comprises providing the one or more sensing signals at a second time interval that is subsequent to the first time interval.

19. A non-transitory computer-readable medium having processor-executable instructions stored thereon, the processor-executable instructions, when executed, facilitating performance of the following:

obtaining, using a set of rotation electrodes that interact with a knob interface, first resulting signals, wherein the set of rotation electrodes is associated with a control system of a vehicle;

obtaining second resulting signals;

determining an initial state of the knob interface during start-up operations for the vehicle using the first resulting signals and the second resulting signals;

obtaining, using the set of rotation electrodes, third resulting signals indicating a first rotational state of the knob interface, based at least in part on the knob interface being rotated from the initial state to the first rotational state;

determining a rotational direction of the knob interface using the first resulting signals, the second resulting signals, and the third resulting signals; and adjusting a setting using the determined rotational direction.

\* \* \* \* \*